US008121020B1

(12) United States Patent
von der Embse

(10) Patent No.: US 8,121,020 B1
(45) Date of Patent: Feb. 21, 2012

(54) QLM DEMODULATION

(75) Inventor: Urbain Alfred von der Embse, Westchester, CA (US)

(73) Assignee: Urbain A. von der Embse, Westchester, CA (US)

( * ) Notice: Subject to any disclaimer, the term of this patent is extended or adjusted under 35 U.S.C. 154(b) by 259 days.

(21) Appl. No.: 12/069,418

(22) Filed: Feb. 11, 2008

Related U.S. Application Data

(63) Continuation-in-part of application No. 10/826,118, filed on Apr. 16, 2004, now Pat. No. 7,006,830, and a continuation-in-part of application No. 10/266,256, filed on Oct. 8, 2002, now Pat. No. 7,391,819, and a continuation-in-part of application No. 10/772,597, filed on Feb. 6, 2004, now Pat. No. 7,337,383.

(51) Int. Cl.
*H04J 9/00* (2006.01)
*H04J 11/00* (2006.01)

(52) U.S. Cl. ........ 370/206; 370/208; 370/210; 370/335; 375/261; 375/265; 375/298

(58) Field of Classification Search .................. 370/204, 370/206, 208, 210, 335, 342; 375/265, 261
See application file for complete search history.

(56) References Cited

U.S. PATENT DOCUMENTS

| | | | |
|---|---|---|---|
| 2002/0031189 A1* | 3/2002 | Hiben et al. | 375/260 |
| 2002/0101936 A1* | 8/2002 | Wright et al. | 375/296 |
| 2002/0176486 A1* | 11/2002 | Okubo et al. | 375/146 |
| 2004/0116078 A1* | 6/2004 | Rooyen et al. | 455/101 |

* cited by examiner

Primary Examiner — Andrew Lee

(57) ABSTRACT

A method for deriving a bound on communications capacity with ideal quadrature layered communications QLM and a set of demodulation algorithms for QLM. Communications links using QLM can approximate this bound and support higher data rates than allowed by the Shannon bound. Demodulation algorithms can be grouped into symbol algorithms and bit algorithms. Bit algorithms support higher data rates than symbol algorithms with lower computational complexities at the expense of demodulation loss which can be reduced with bit correlation error correction decoding which is orthogonal to the channel error correction decoding. Representative symbol and bit implementation algorithms are derived. Modulation performance is compared with phase-shift-keying PSK and quadrature amplitude modulation QAM. The invention describes how QLM can be used with PSK, QAM and with gaussian minimum shift keying GMSK, orthogonal frequency division multiple access OFDMA, code division multiple access CDMA, and wavelet division multiple access WDMA.

8 Claims, 24 Drawing Sheets

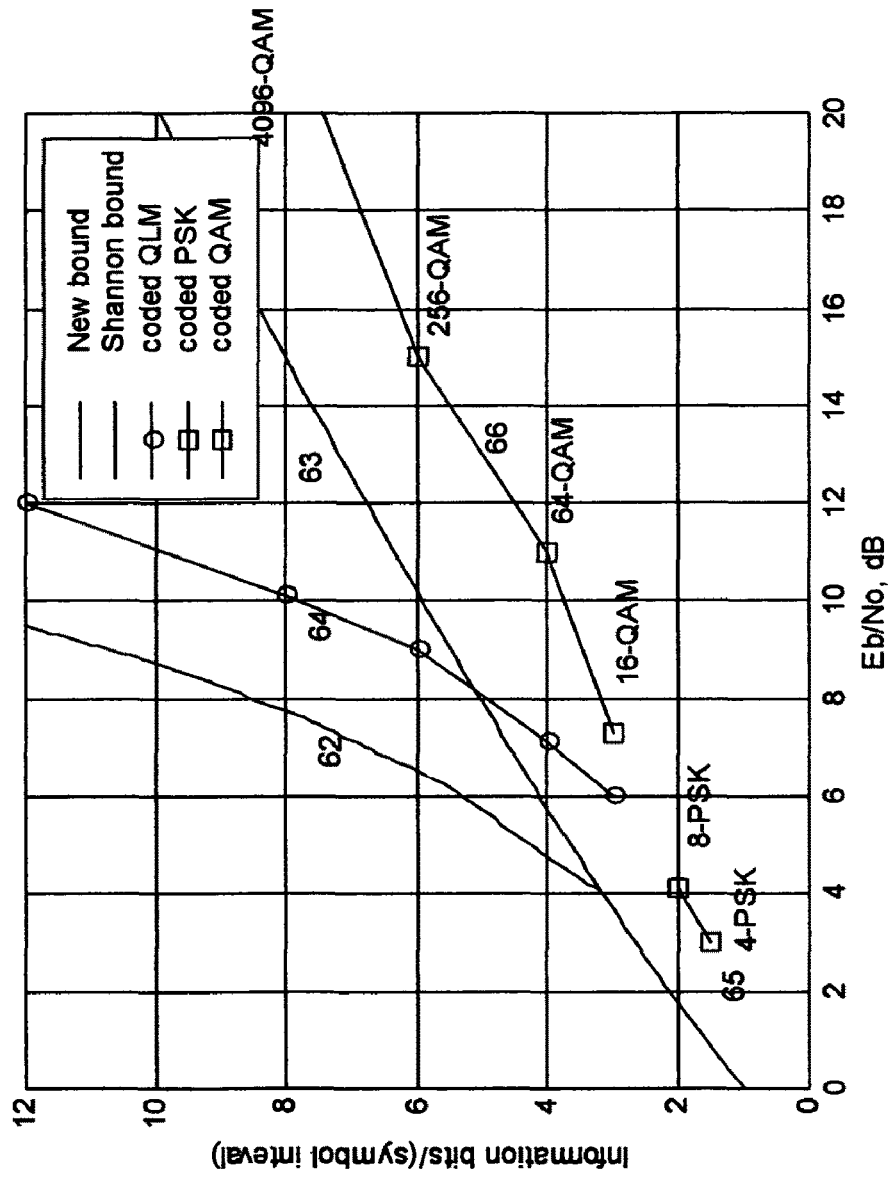
FIG. 1  Information bits/(symbol interval) vs. $E_b/N_o$ for new bound, Shannon bound and for coded QLM, PSK, QAM at BER=1e-6

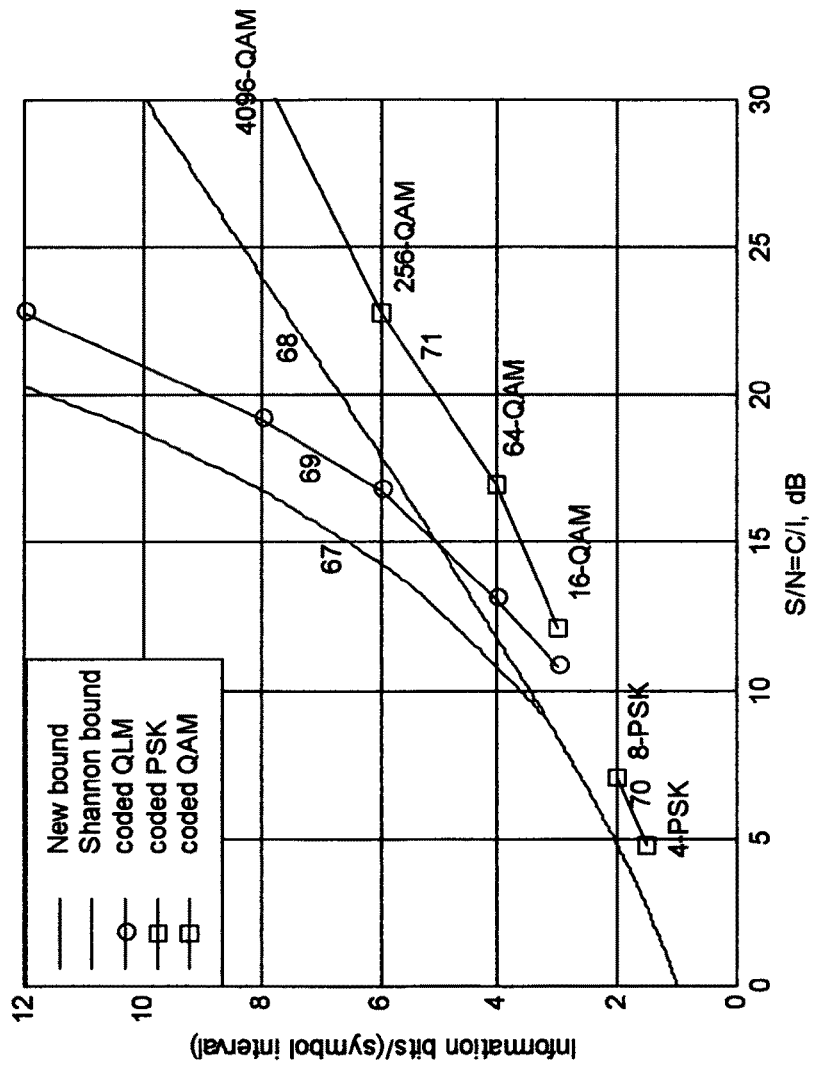
FIG. 2 Information bits/(symbol interval) vs. S/N=C/I for new bound, Shannon bound, and for coded QLM, PSK, QAM at BER=1e-6

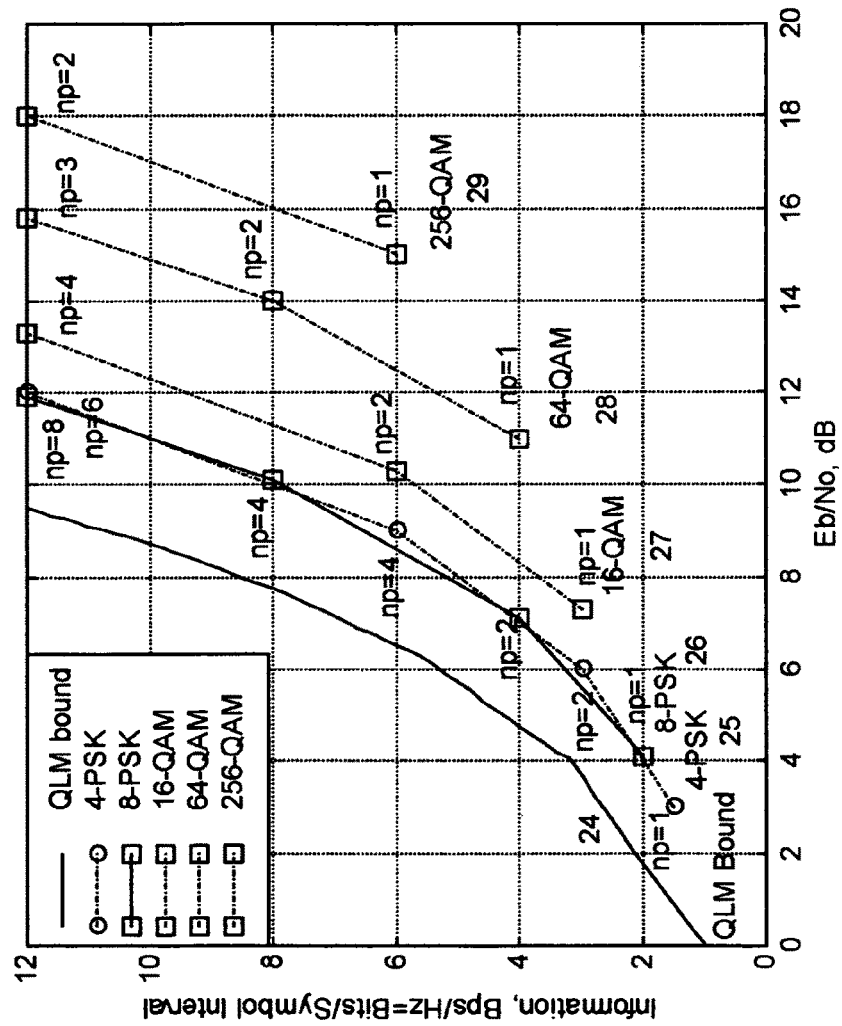
FIG. 3 Information bits/(symbol interval) vs. $E_b/N_o$ for QLM PSK, QLM QAM

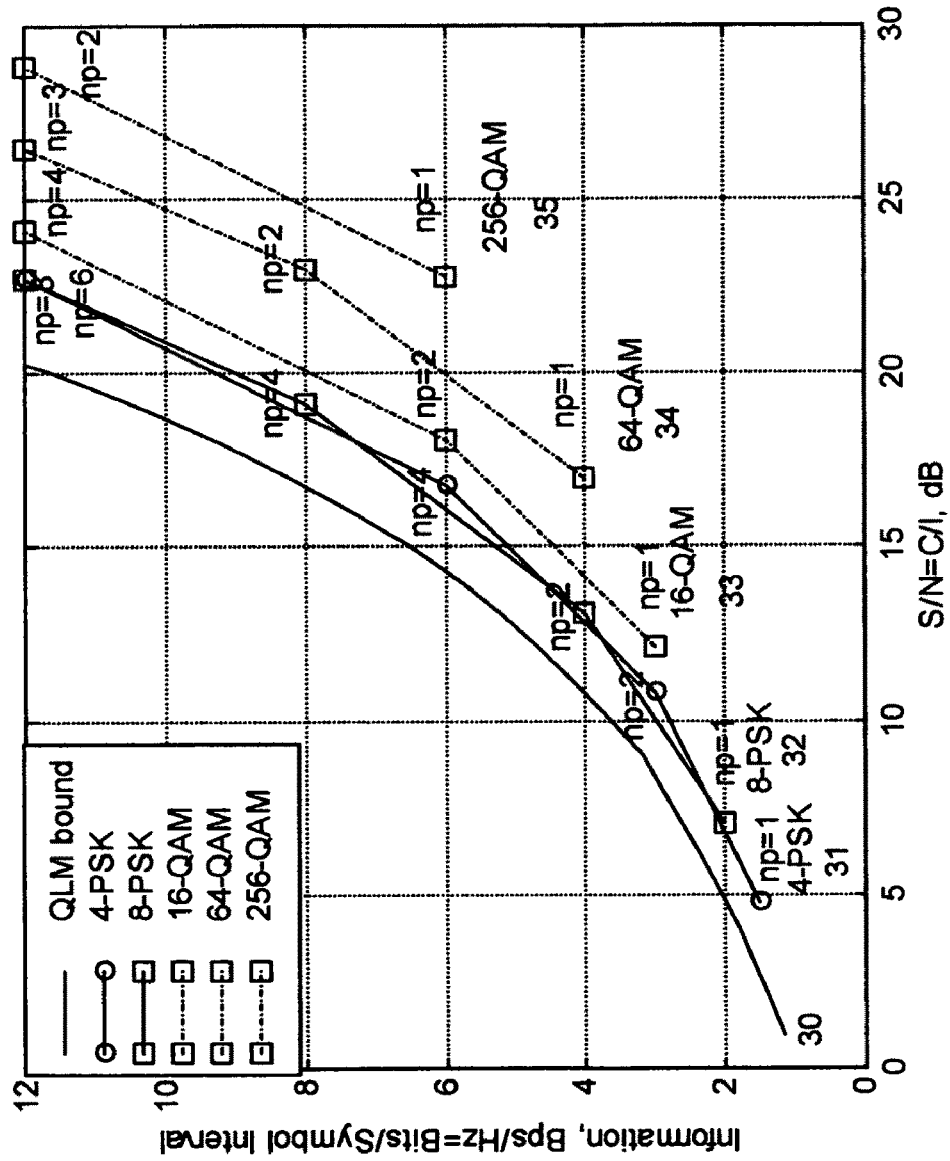
FIG. 4 Information bits/(symbol interval) vs. S/N=C/I for QLM PSK, QLM QAM

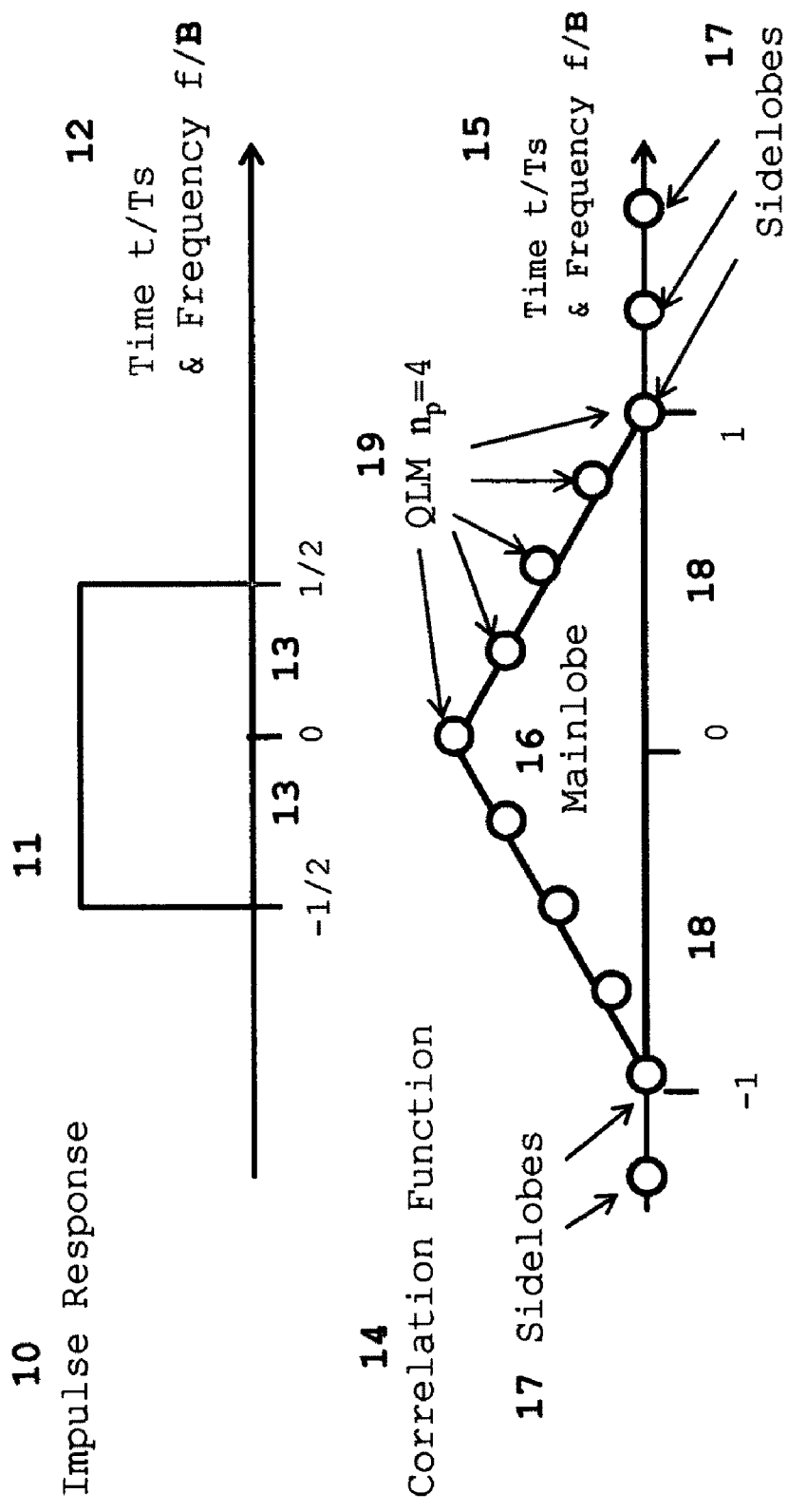
FIG. 5  Correlation in time and frequency for ideal impulse response without/with QLM for $n_p=4$

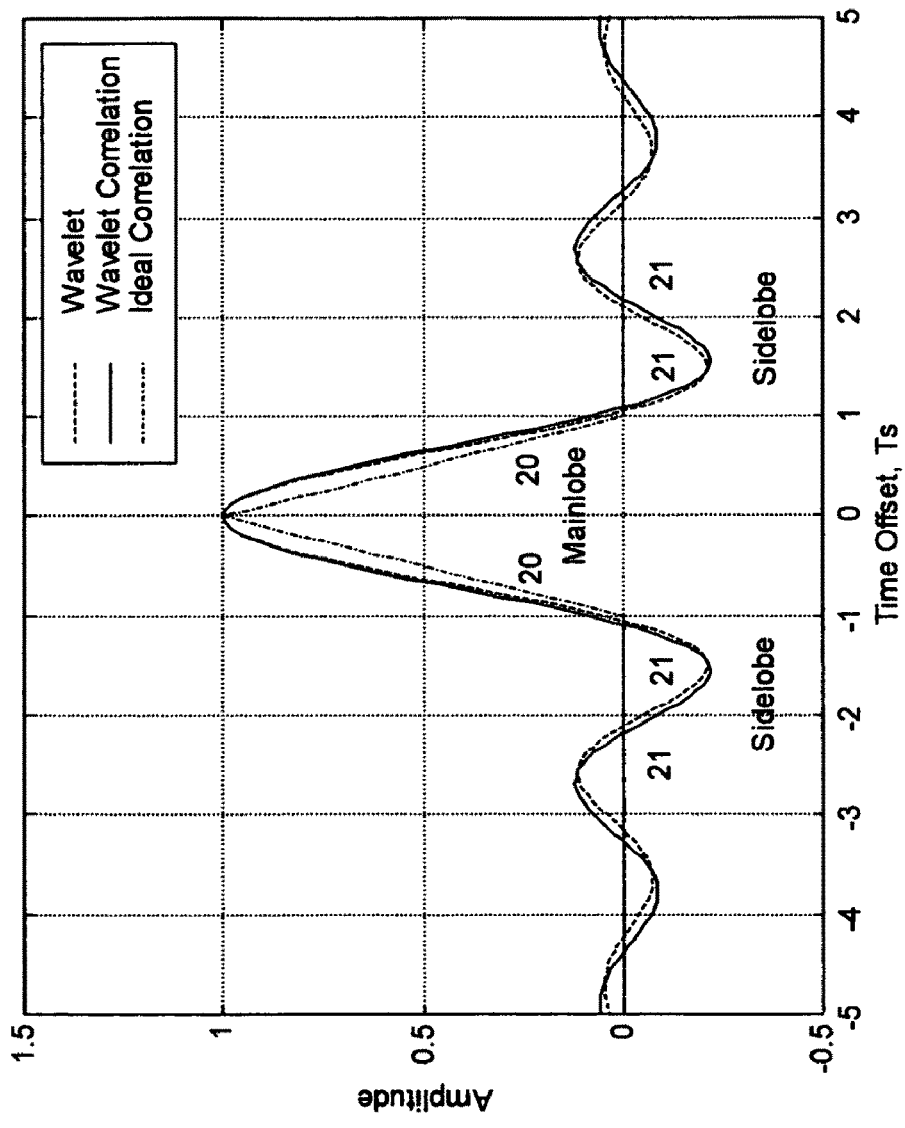
FIG. 6  OWDMA Wavelet waveform, correlation, and ideal correlation in time

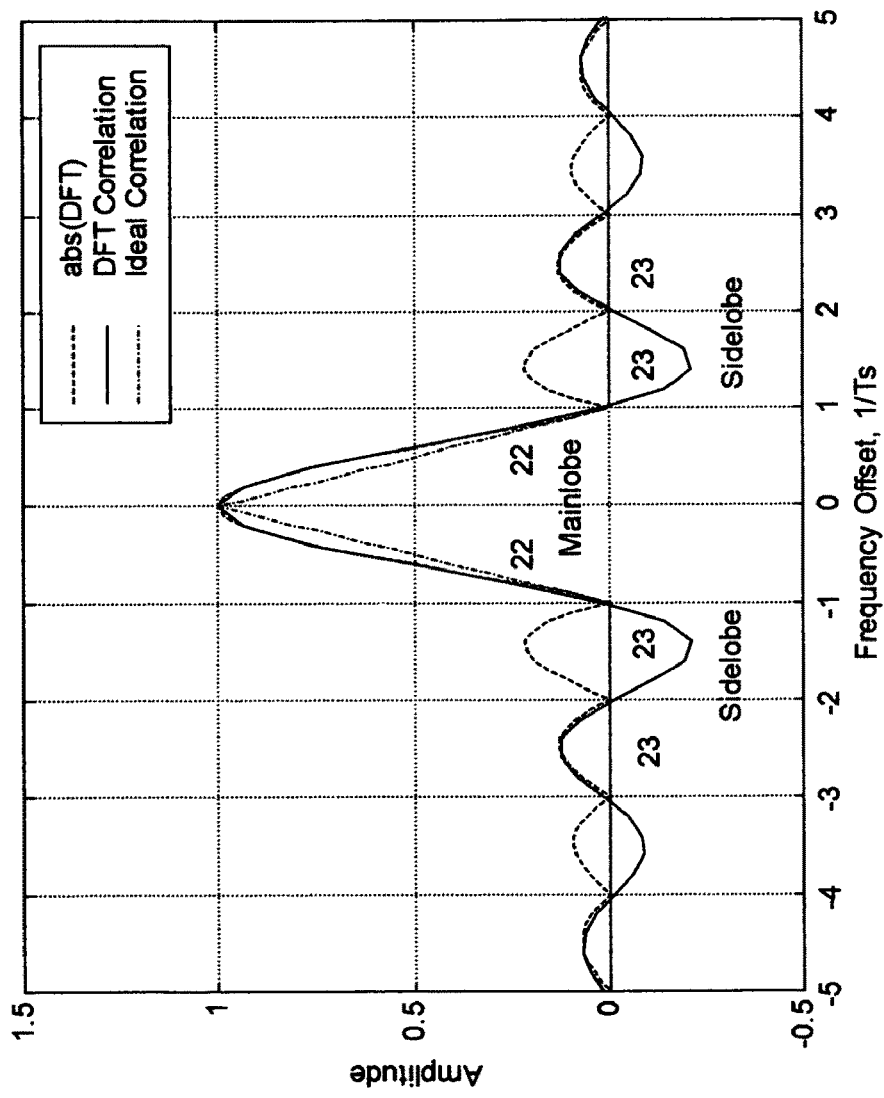
FIG. 7  OFDMA DFT waveform, correlation, and ideal correlation in frequency

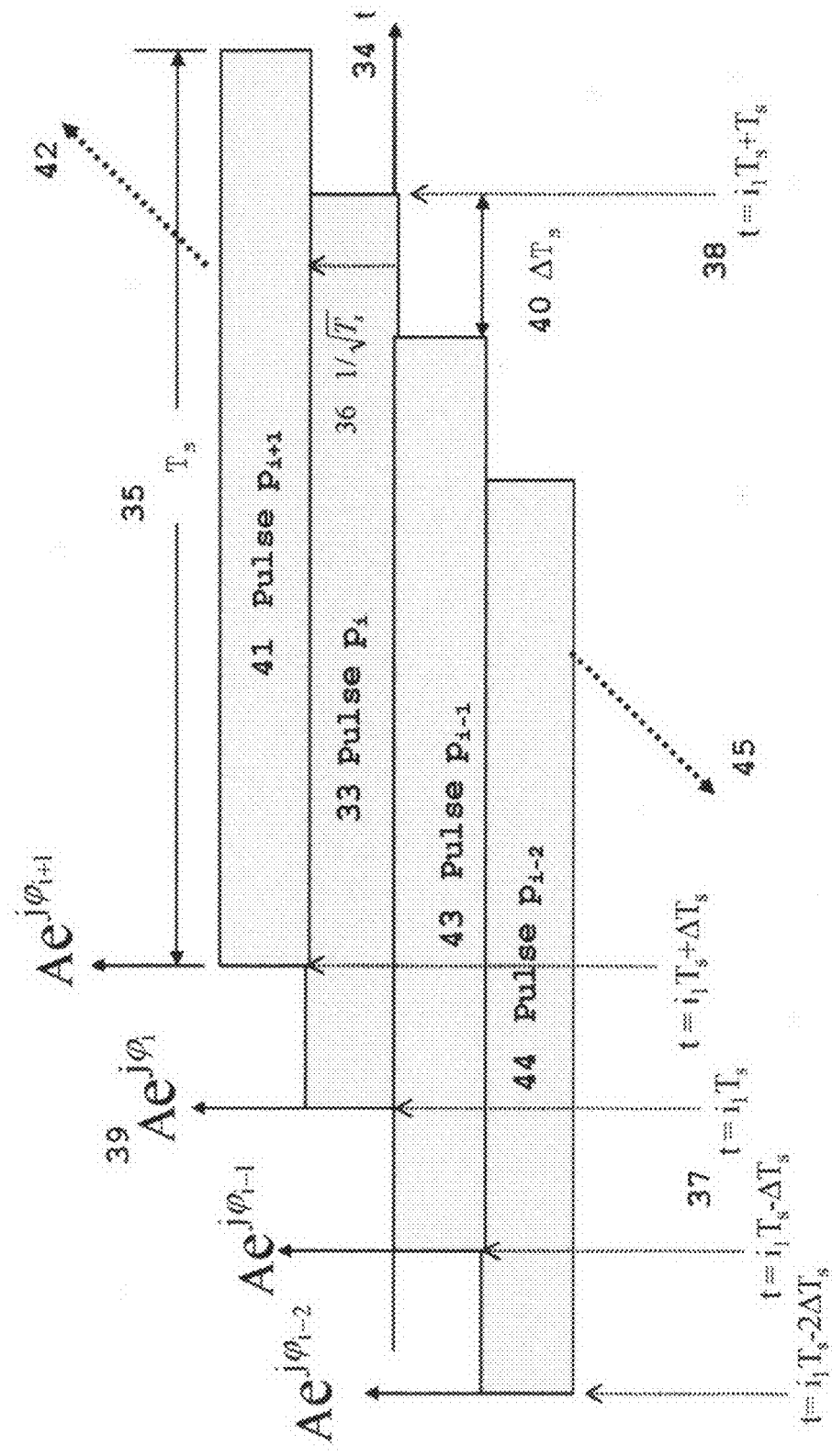
FIG. 8 QLM complex baseband modulation signal for ideal pulse waveform

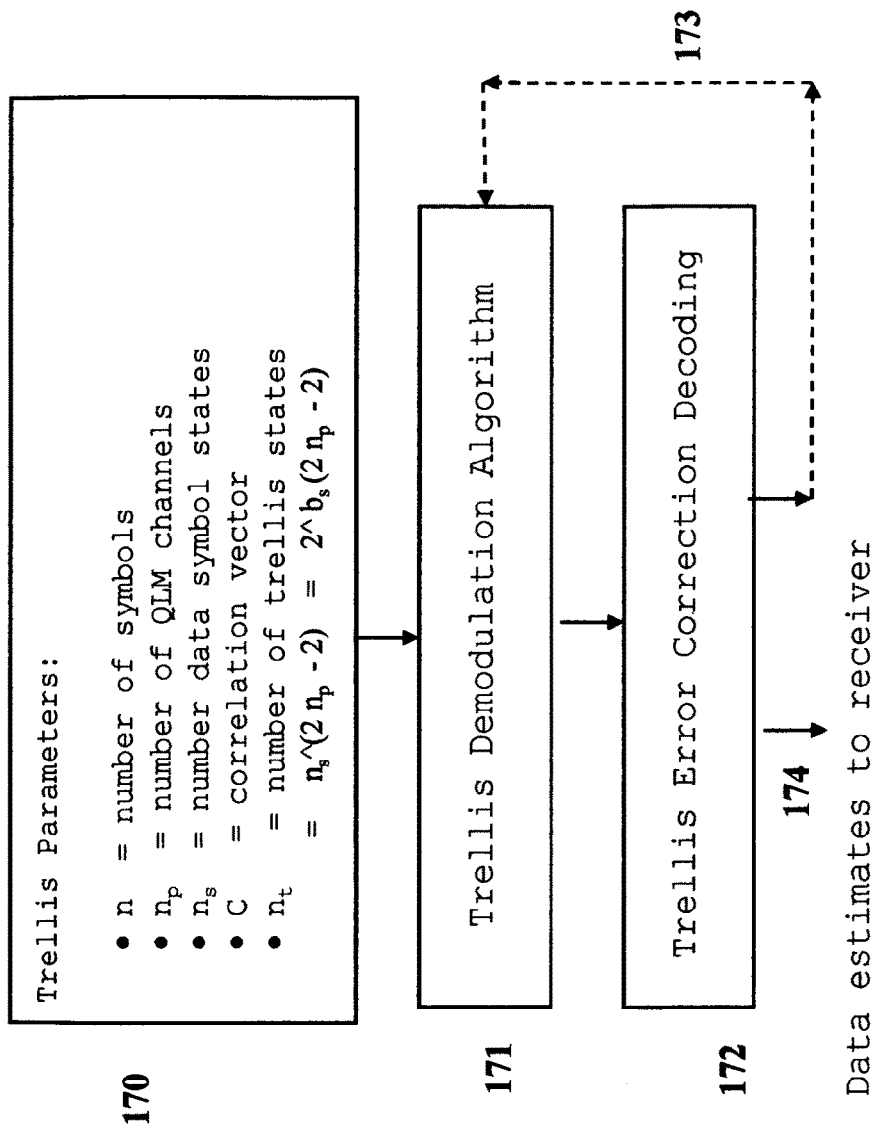
FIG. 9A QLM Trellis Symbol Algorithm

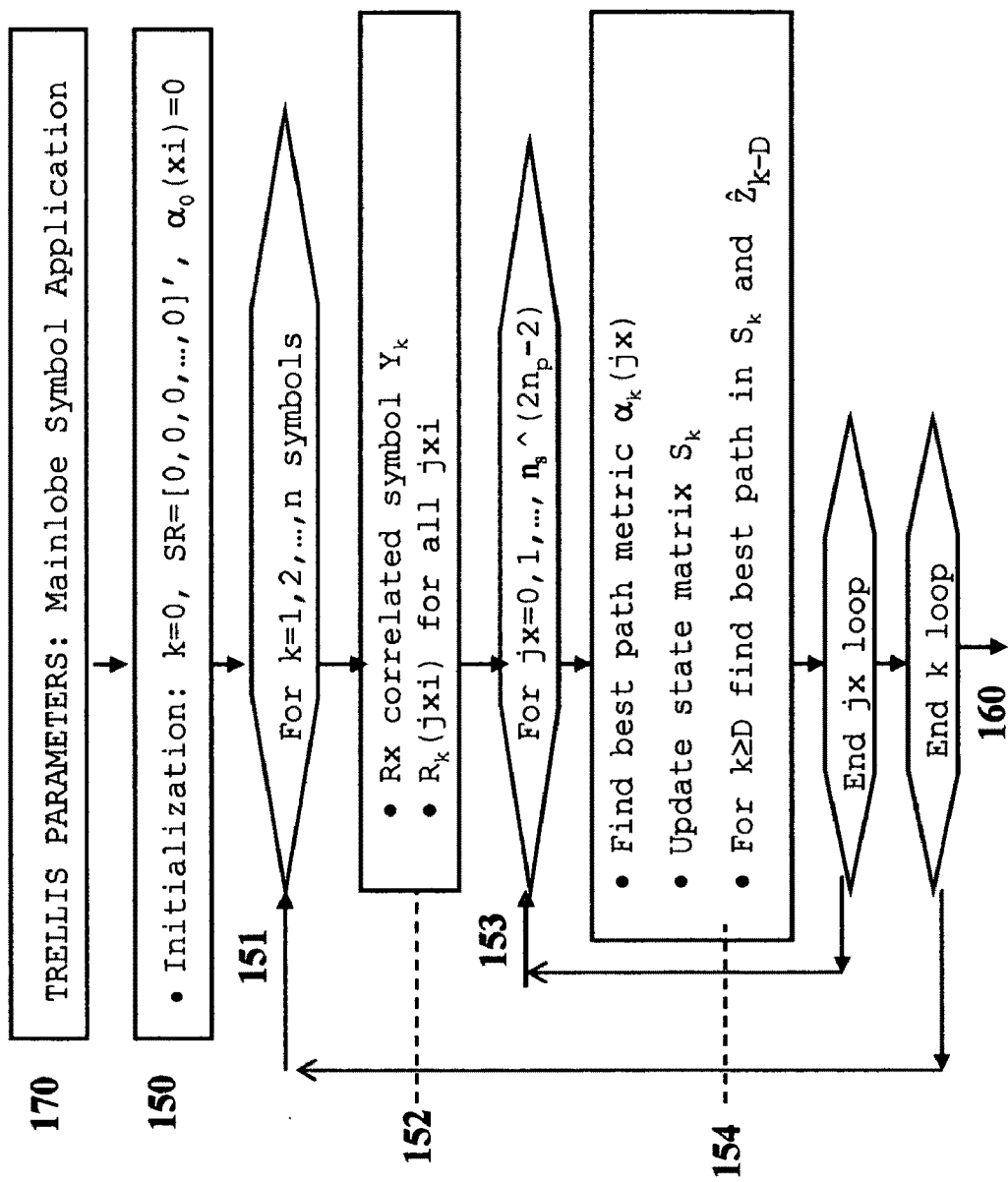
FIG. 9B Trellis Algorithm - Continued

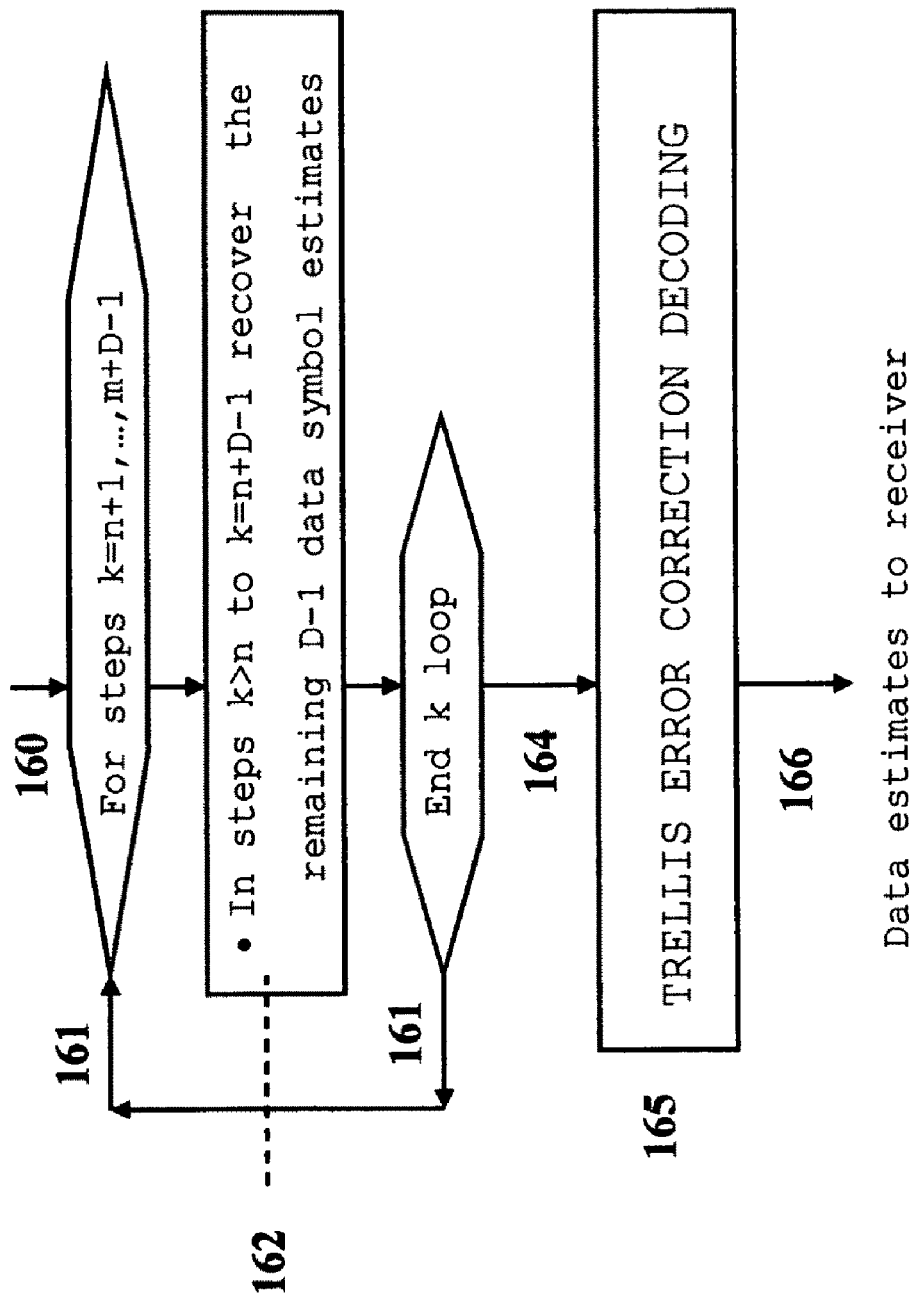
FIG. 9C Trellis Algorithm - Continued

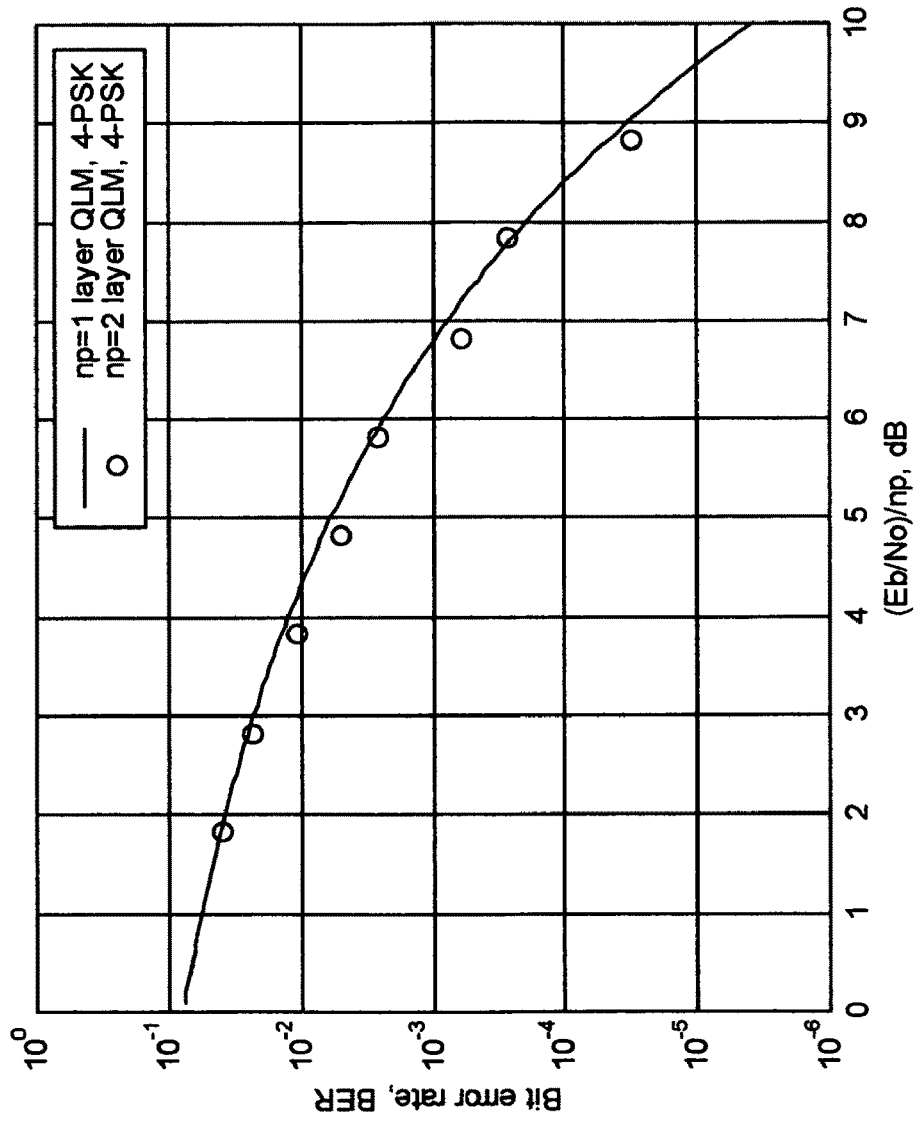
FIG. 10  QLM BER Performance for uncoded QLM for 4-PSK, $n_p = 1, 2$ layers

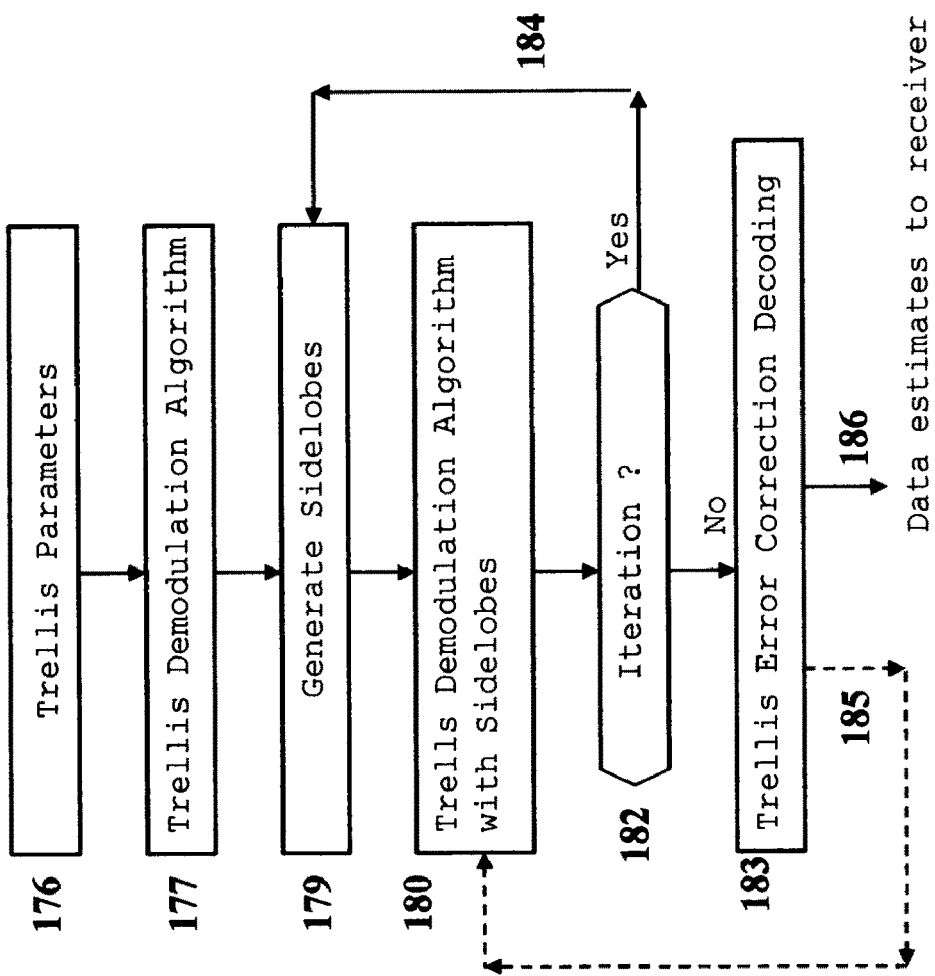
FIG. 11 QLM Trellis Symbol Iterative Algorithm

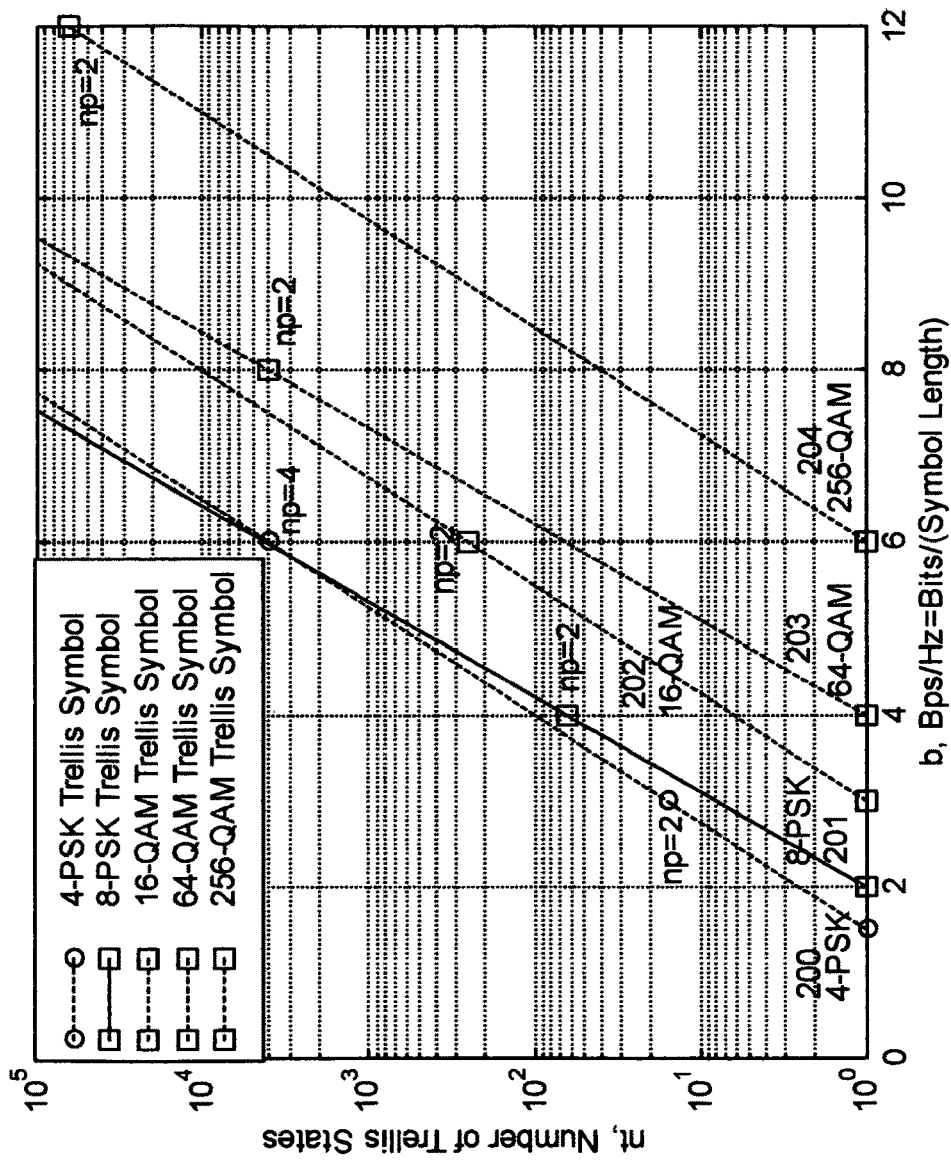
FIG. 12  Trellis Symbol Algorithm Complexity Metric: Number of Trellis Paths vs. b

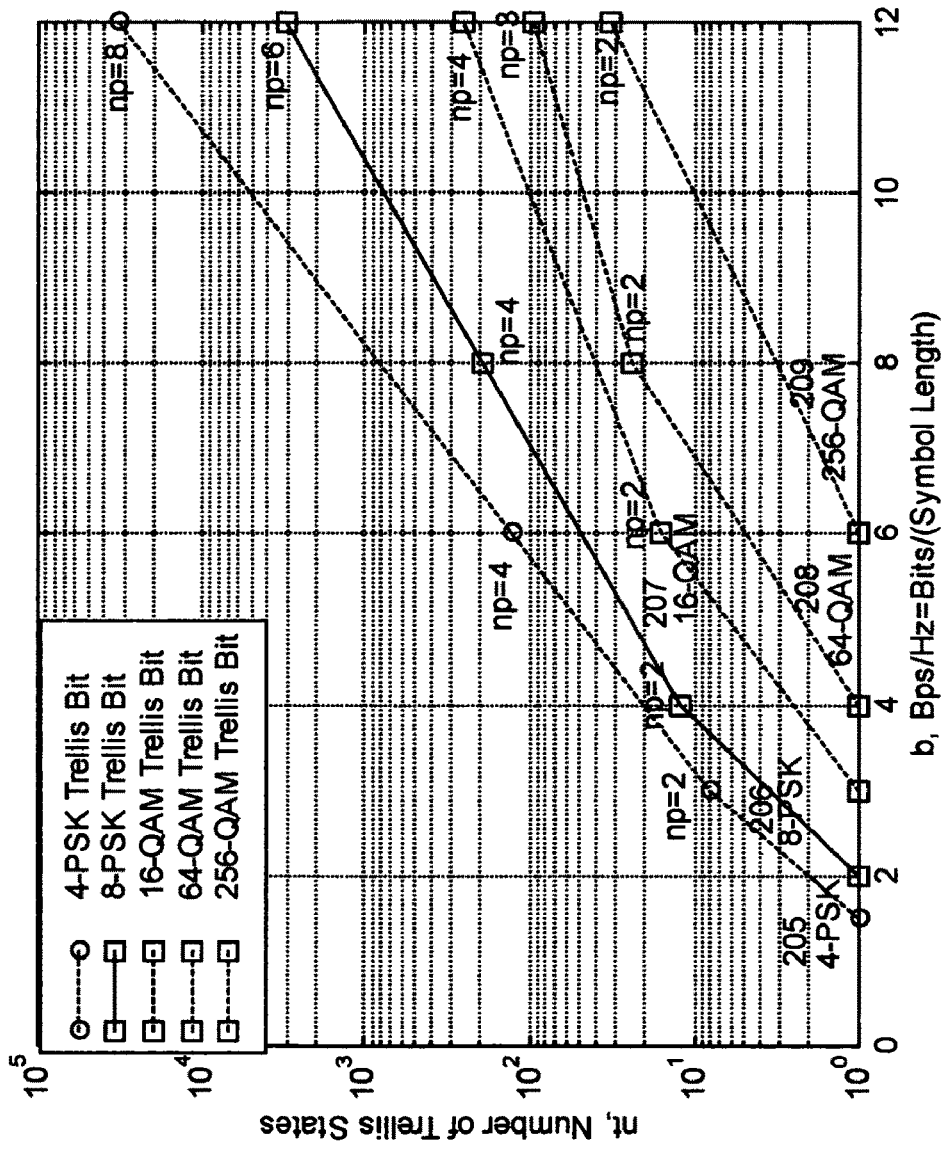
FIG. 13  Trellis Bit Algorithm Complexity Metric: Number of Trellis States vs. b

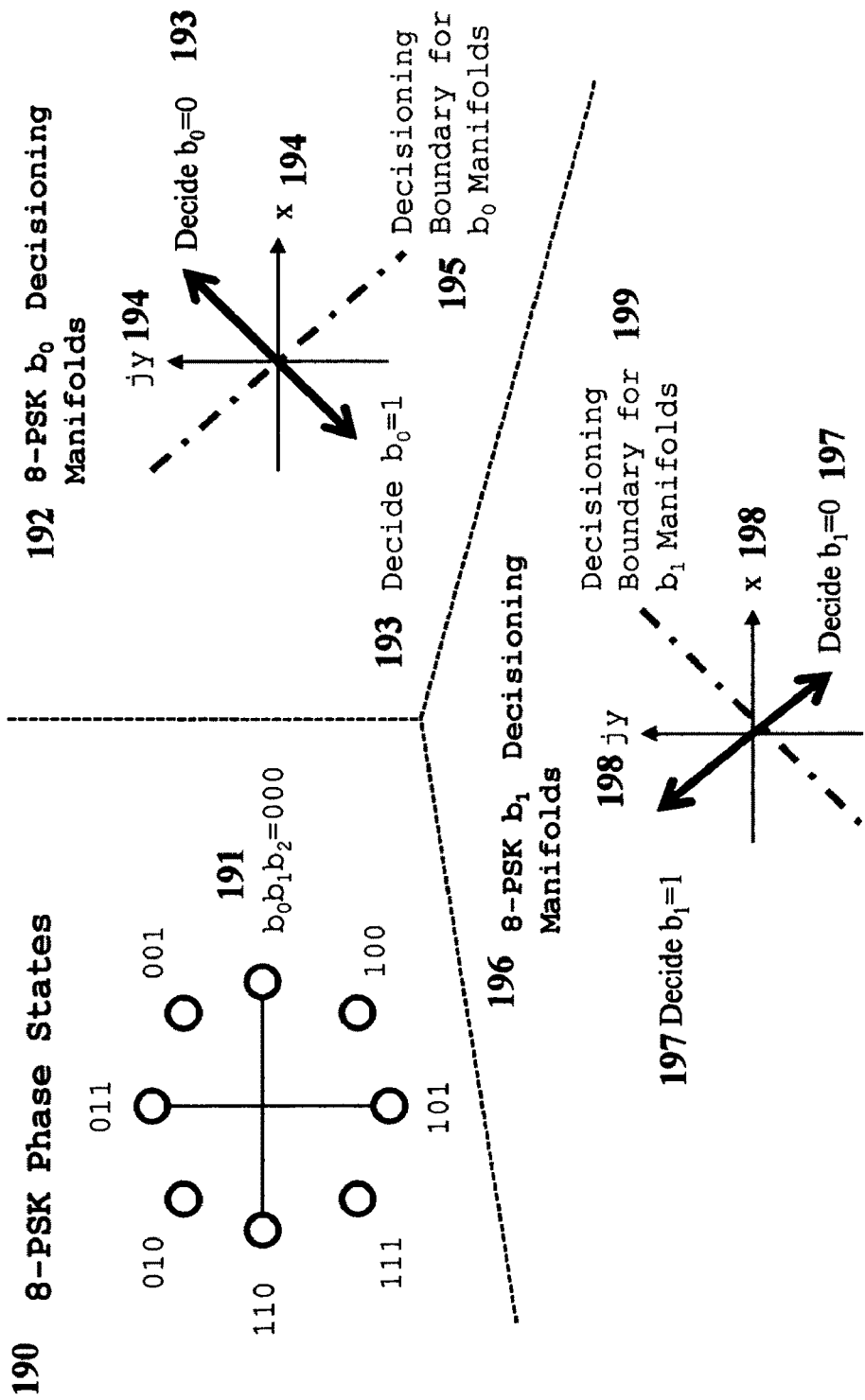
FIG. 14 Bit Decisioning Manifolds: 8-PSK Example

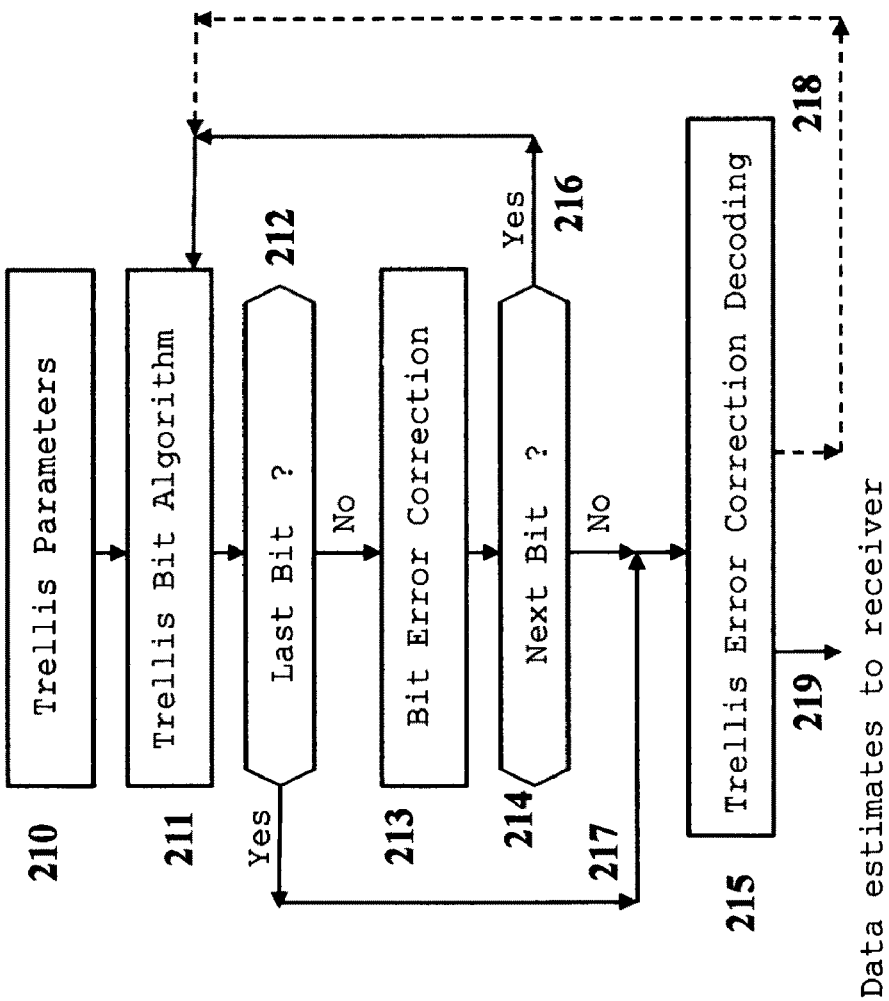
FIG. 15 QLM Trellis Bit Algorithm

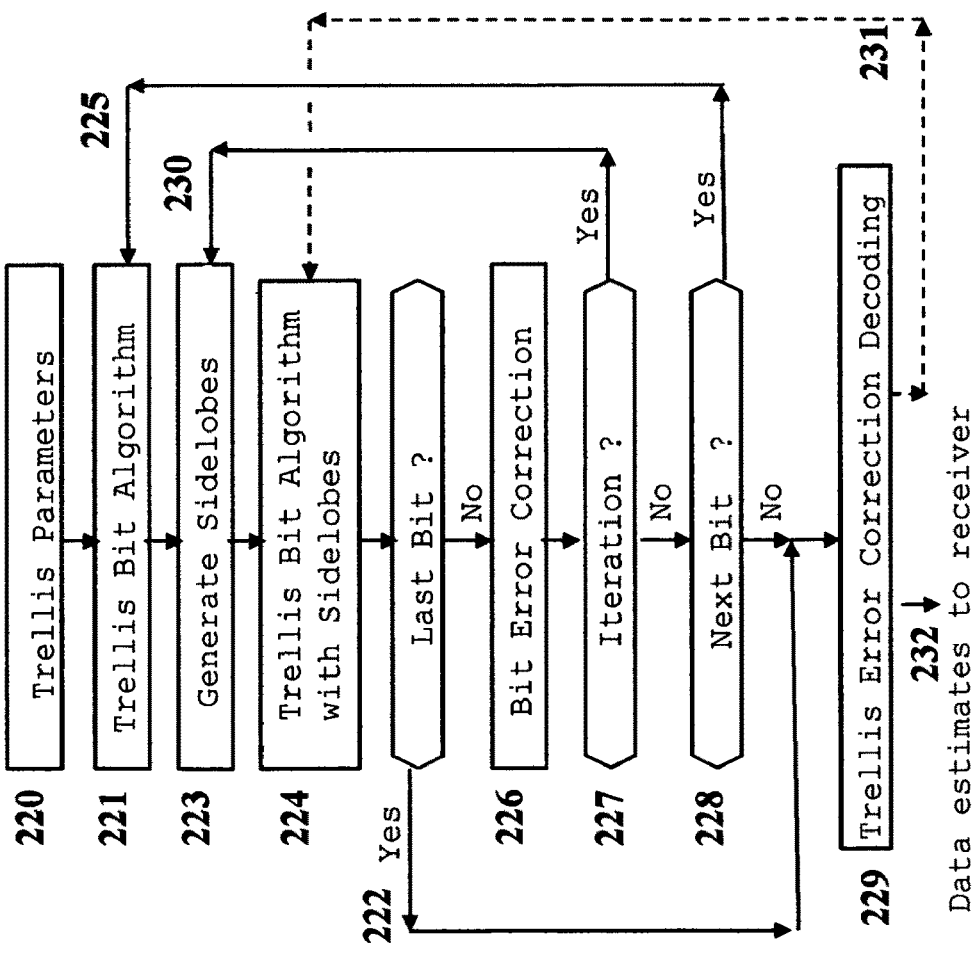
FIG. 16 QLM Trellis Bit Iterative Algorithm

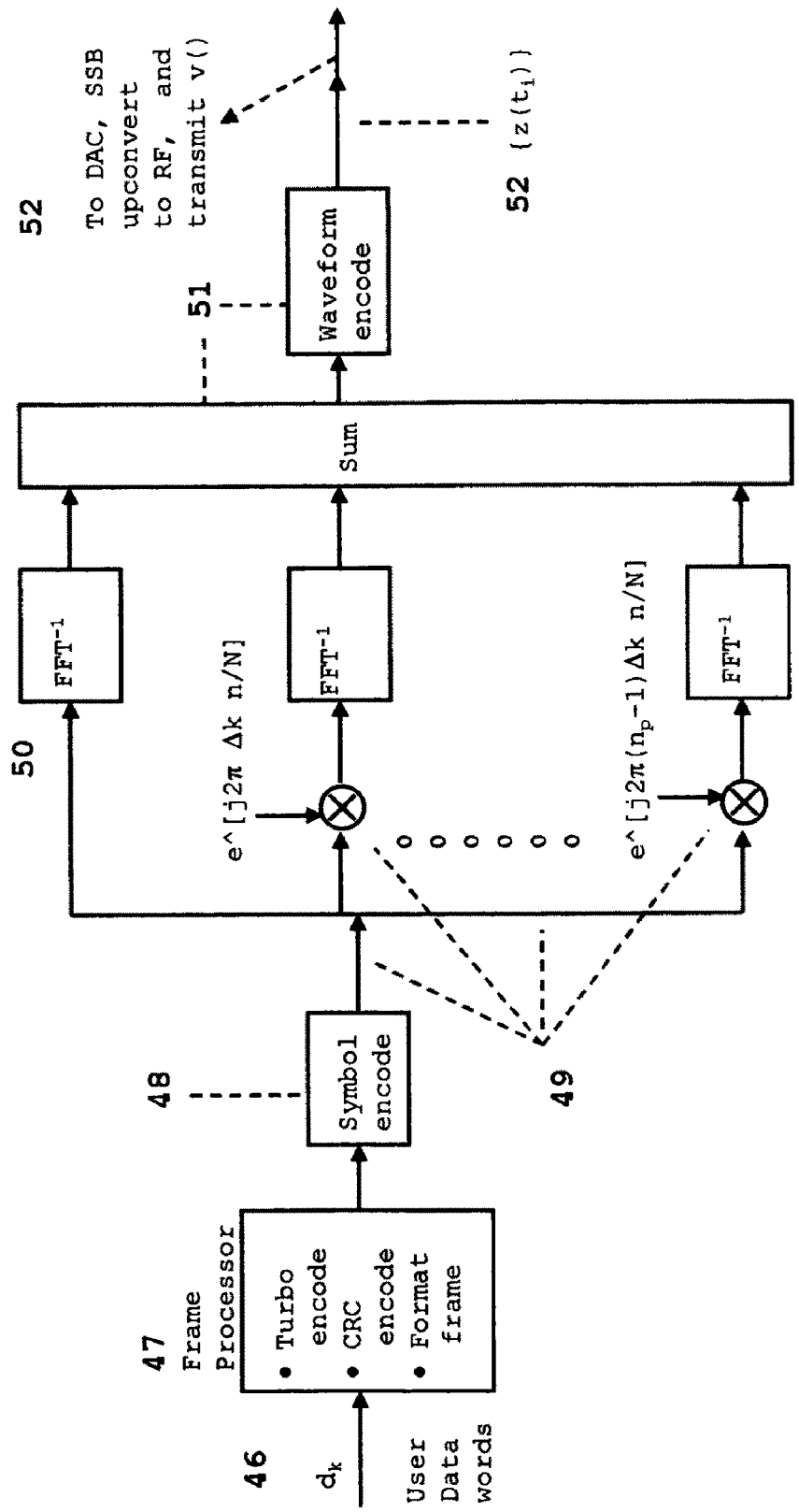
FIG. 17 QLM Transmitter Block Diagram for OFDMA

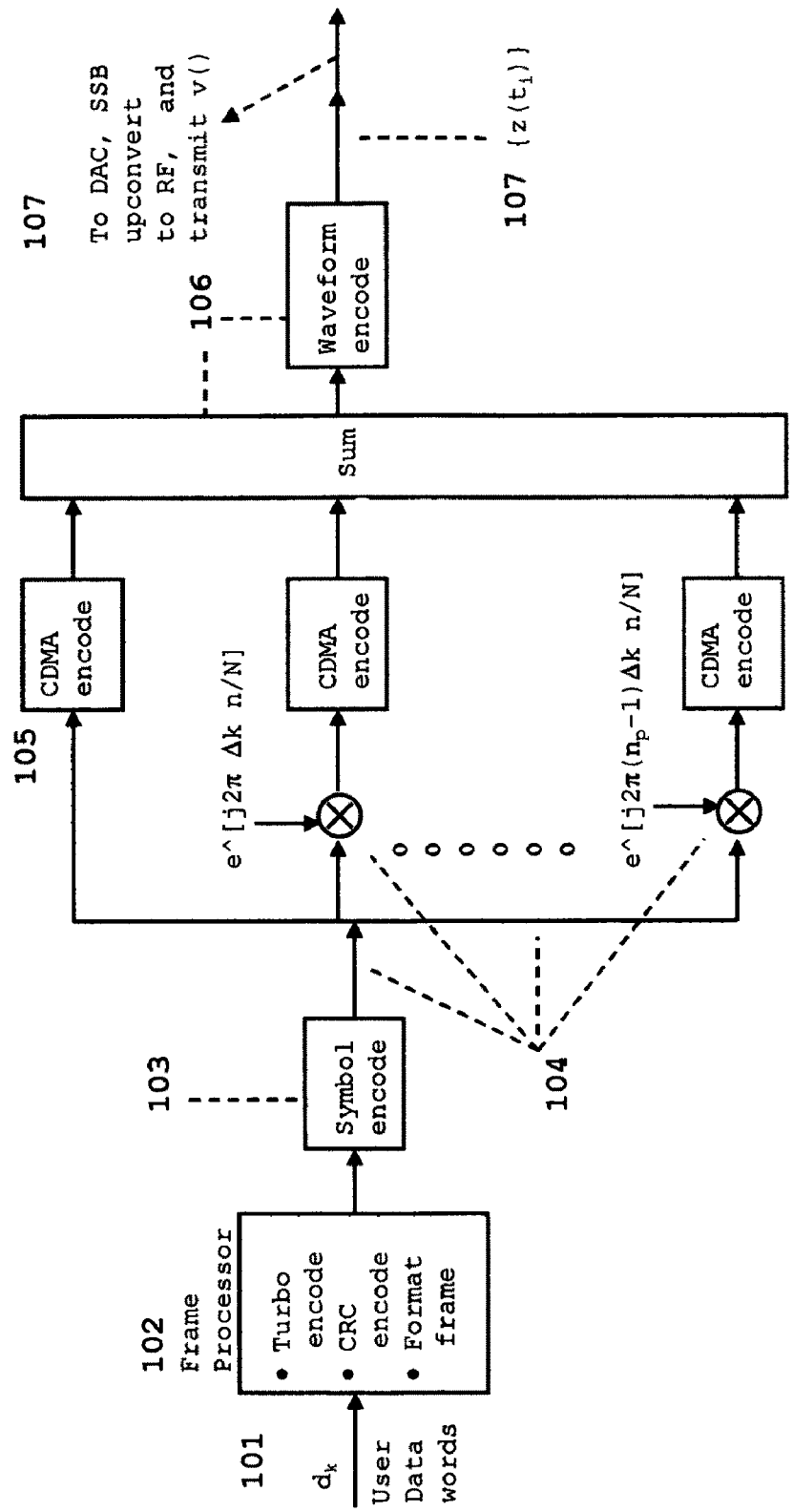
FIG. 18 QLM Transmitter Block Diagram for CDMA

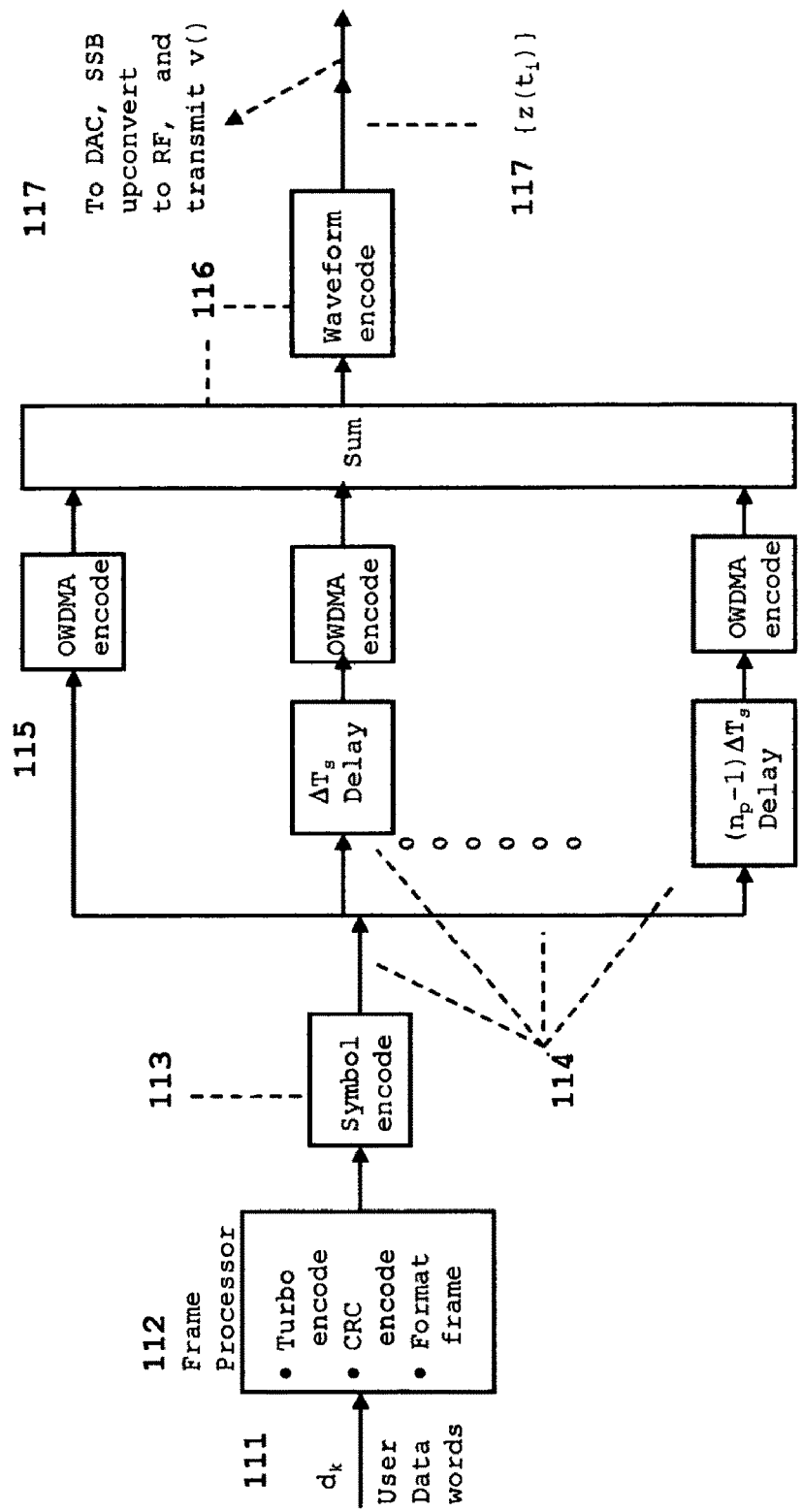
FIG. 19 QLM Transmitter Block Diagram for OWDMA

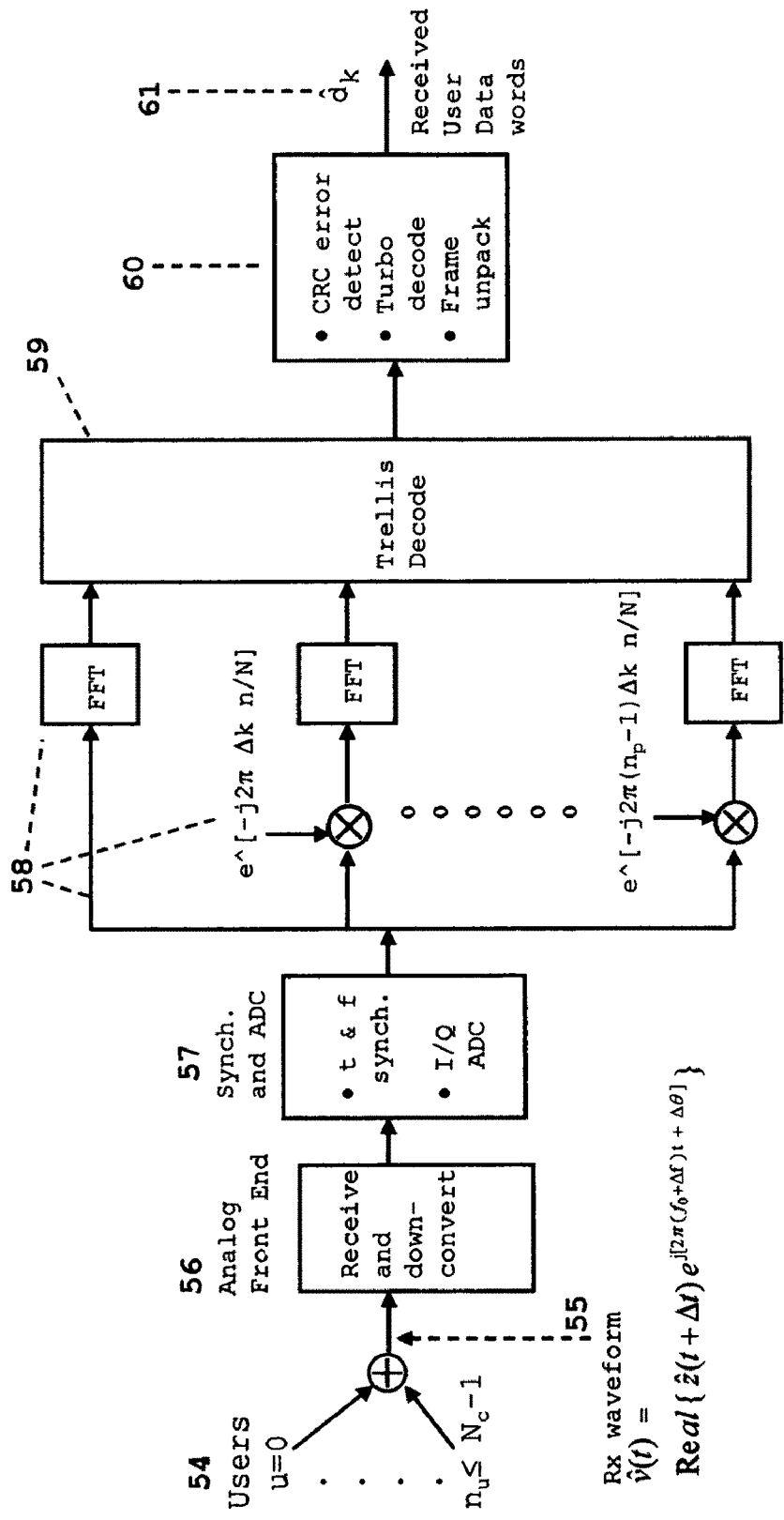
FIG. 20 QLM Receiver Block Diagram for OFDMA

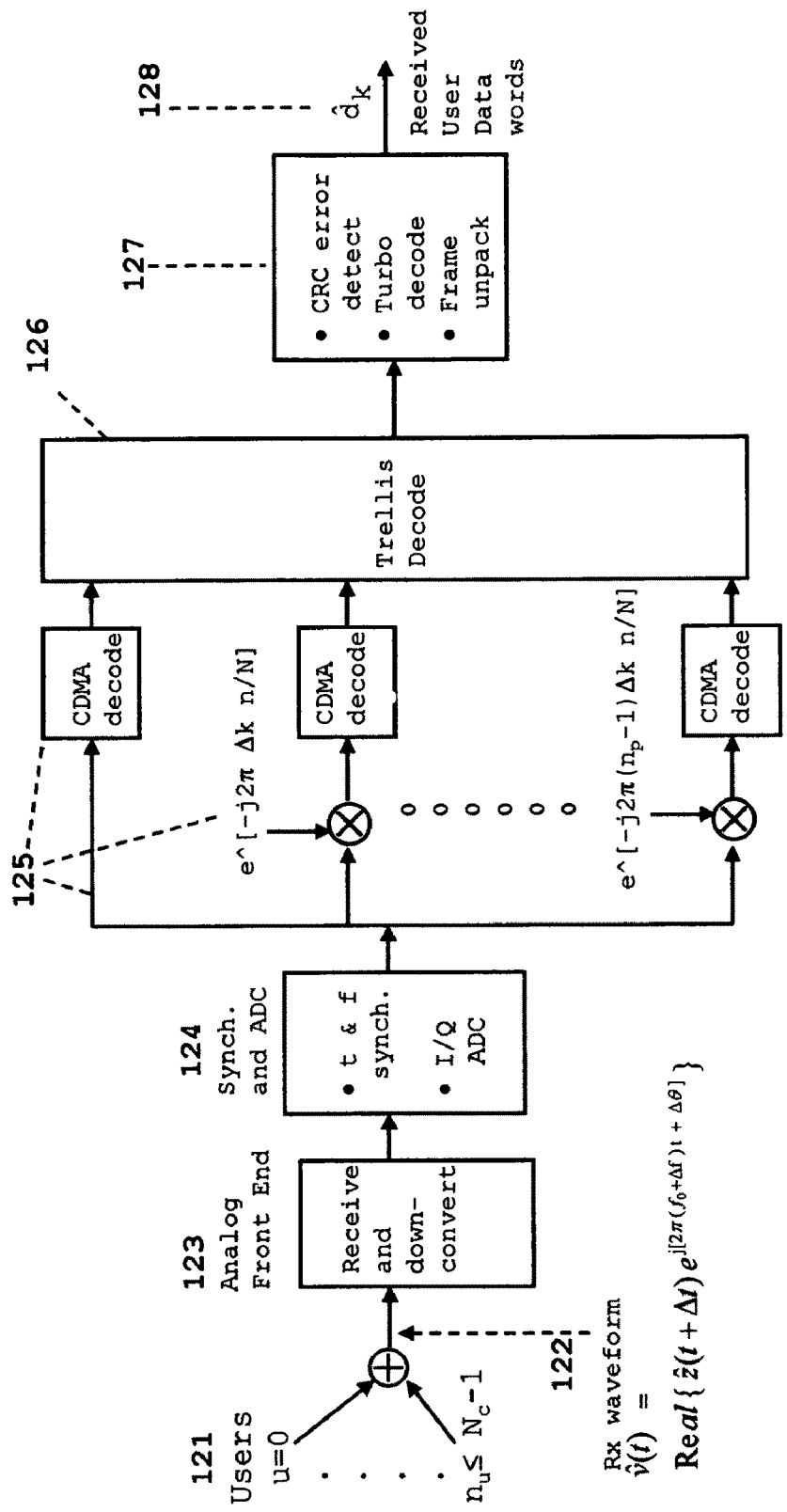
FIG. 21 QLM Receiver Block Diagram for CDMA

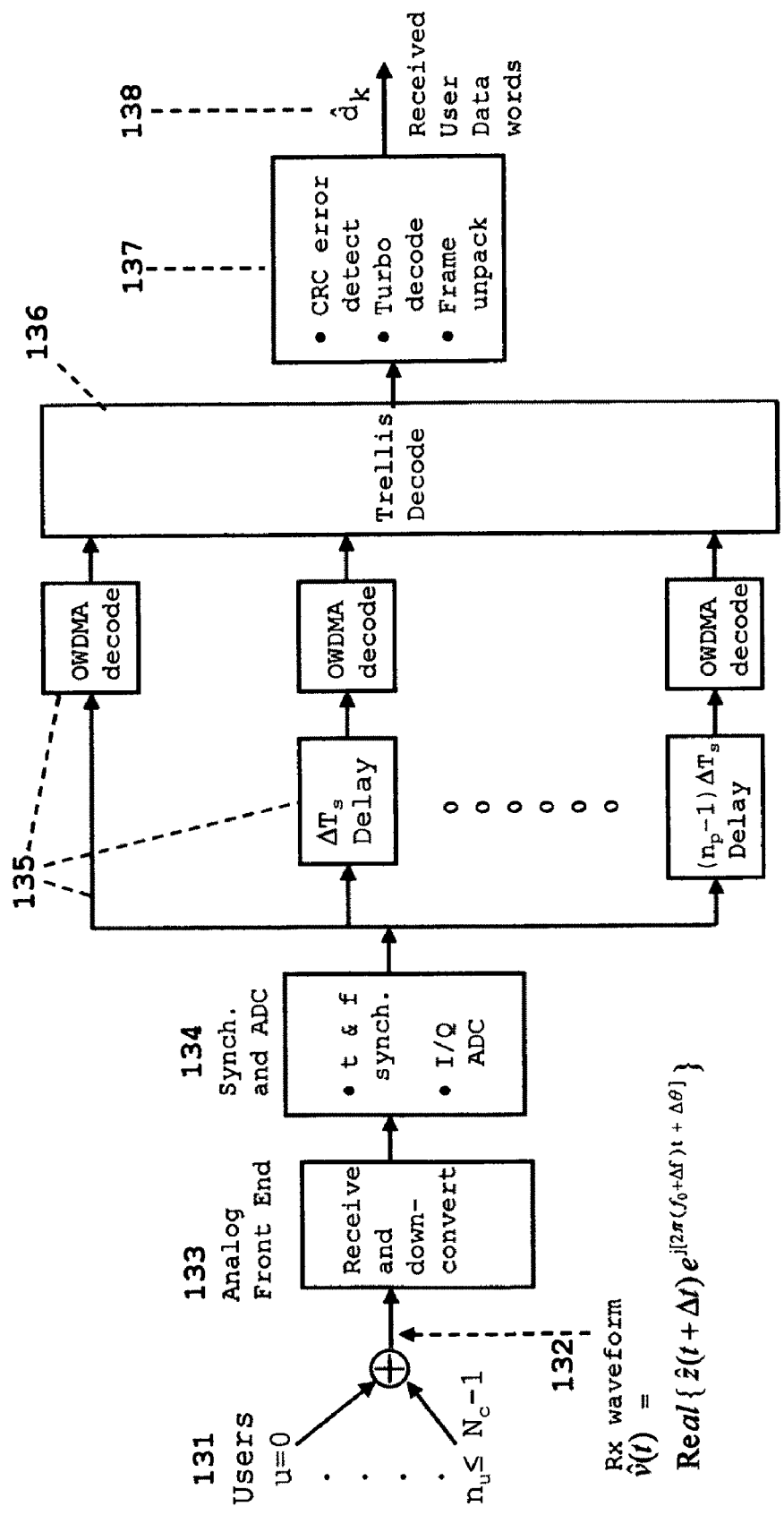
FIG. 22 QLM Receiver Block Diagram for OWDMA

QLM DEMODULATION

CROSS-REFERENCE TO RELATED APPLICATIONS

This patent application is a continuation in part of application Ser. Nos. 10/826,118 filed on Apr. 16, 2004, now U.S. Pat. No. 7,006,830, 10/266,256 filed on Oct. 8, 2002, now U.S. Pat. No. 7,391,819 and application Ser. No. 10/772,597 filed on Feb. 6, 2004 now U.S. Pat. No. 7,337,383.

U.S. PATENT DOCUMENTS

| | | |
|---|---|---|
| U.S.-9.826,117 | October 2007 | von der Embse, U. A. |
| U.S. Pat. No. 7,010,048 | March 2006 | Shattil, Stephen J. |
| U.S.-6-856,652 | February 2006 | West et. al. |
| U.S.-2002/0176486 | November 2002 | Okubo, et. al. |
| U.S.-2002/0101936 | August 2002 | Wright et. al. |
| U.S.-2002/0031189 | March 2002 | Hiben et. al. |
| U.S. Pat. No. 6,804,307 | October 2004 | Popović, Branislav SE |
| U.S. Pat. No. 6,798,737 | September 2004 | Dabak et. al. |
| U.S. Pat. No. 6,731,618 | May 2004 | Chung et. al. |
| U.S. Pat. No. 6,731,668 | May 2004 | John Ketchum |
| U.S. Pat. No. 6,728,517 | April 2004 | Sugar et. al. |
| U.S. Pat. No. 6,711,528 | March 2004 | Dishman et. al. |
| U.S. Pat. No. 6,687,492 | February 2004 | Sugar et. al. |
| U.S. Pat. No. 6,674,712 | January 2004 | Yang et. al. |
| U.S. Pat. No. 6,647,078 | November 2003 | Thomas et. al. |
| U.S. Pat. No. 6,636,568 | October 2003 | Tamer Kadous |
| U.S. Pat. No. 6,504,506 | January 2003 | Thomas et. al. |
| U.S. Pat. No. 6,426,723 | July 2003 | Smith et. al. |

U.S. PATENT APPLICATIONS

| | | |
|---|---|---|
| U.S. application Ser. No. 10/772,597 | February 2004 | von der Embse, U. A. |
| U.S. application Ser. No. 10/266,256 | October 2002 | von der Embse, U. A. |
| U.S. application Ser. No. 09/846,410 | February 2001 | von der Embse, U. A. |
| U.S. application Ser. No. 09/826,118 | January 2001 | von der Embse, U. A. |

OTHER PUBLICATIONS

C. Heegard and S. B. Wicker's book "Turbo Coding", Kluwer Academic Publishers 1999

B. Vucetic and J. Yuan's book "Turbo Codes", Kluwer Academic Publishers 2000

J. G. Proakis's book "Digital Communications". McGraw Hill, Inc. 1995

L. Hanzo, C. H. Wong, M. S. Lee's book "Adaptive Wireless Transceivers", John Wiley & Sons 2002

C. E. Shannon "A Mathematical Theory of Communications", Bell System Technical Journal, 27:379-423, 623-656, October 1948

BACKGROUND OF THE INVENTION

I. Field of the Invention

The present invention relates to the Shannon bound on communications capacity and also relates to symbol modulation and demodulation for high-data-rate wired, wireless, and optical communications and includes the symbol modulations phase-shift-keying PSK, quadrature amplitude modulation QAM, bandwidth efficient modulation BEM, gaussian minimum shift keying GMSK, pulse position modulation PPM, and the plurality of current and future modulations for single links and multiple access links which include time division multiple access TDMA, frequency division multiple access FDMA, code division multiple access CDMA, spatial division multiple access SDMA, frequency hopping FH, optical wavelength division multiple access WDMA, orthogonal Wavelet division multiple access OWDMA, combinations thereof, and the plurality of radar, optical, laser, spatial, temporal, sound, imaging, and media applications. Communication application examples include electrical and optical wired, mobile, point-to-point, point-to-multipoint, multi-point-to-multipoint, cellular, multiple-input multiple-output MIMO, and satellite communication networks.

II. Description of the Related Art

The Shannon bound is the Shannon capacity theorem for the maximum data rate C and equivalently can be restated as a bound on the corresponding number of modulation bits per symbol as well as a bound on the communications efficiency and is complemented by the Shannon coding theorem. From Shannon's paper "A Mathematical Theory of Communications" Bell System Technical Journal, 27:379-423, 623-656, October 1948 and B. Vucetic and J. Yuan's book "Turbo Codes", Kluwer Academic Publishers 2000, the Shannon (Shannon-Hartley theorem) capacity theorem, the corresponding Shannon bound on the information bits b per symbol, the Shannon bound on the communications efficiency $\eta$, and the Shannon coding theorem can be written as equations (1).

Shannon bounds and coding theorem (1)

1. Shannon capacity theorem $$C = B \log_2(1 + S/N)$$

= Channel capacity in bits/second = Bps for an additive white Gaussian noise $AWGN$ channel with bandwidth $B$ wherein "$\log_2$" is the logarithm to the base 2

= Maximum rate at which information can be reliably transmitted over a noisy channel where $S/N$ is the signal-to-noise ratio in $B$ 2. Shannon bound on $b$, $\eta$, and $E_b/N_o$ $$\max\{b\} = \max\{C/B\}$$
$$= \log_2(1 + S/N)$$
$$= \max(\eta)$$
$$E_b/N_o = [2^{\wedge}\max\{b\} - 1]/\max\{b\}$$

wherein $b = C/B$, Bps/Hz = Bits/symbol $\eta = b/T_s B$, Bps/Hz $T_s$ = symbol interval 3. Shannon coding theorem for the infomation bit rate $R_b$ For $R_b < C$ there exists codes which support reliable communications For $R_b > C$ there are no codes which support reliable communications Using the assumption that the symbol rate $1/T_s$ is maximized which means $1/T_s$=Nyquist rate=bandwidth B and is equivalent $T_s B=1$, enables 1 in equations (1) defining C to be rewritten to calculate max{b} as a function of the signal-tonoise ratio S/N, and to calculate $E_b/N_o$ which is the ratio of energy per information bit $E_b$ to the noise power density $N_o$, as a function of the max{b} in 2 and wherein max{b} is the maximum value of the number of information bits per symbol b. Since the communications efficiency $\eta=b/(T_sB)$ in bits/sec/ Hz it follows that maximum values of b and $\eta$ are equal. The derivation of the equation for $E_b/N_o$ uses the definition $E_b/N_o=(S/N)/b$ in addition to 1 and 2. Reliable communications in the statement of the Shannon coding theorem 3 means an arbitrarily low bit error rate BER.

SUMMARY OF THE INVENTION

This invention introduces a bound on communications capacity that can be supported by a communications channel with frequency bandwidth B and signal-to-noise ratio S/N, a quadrature parallel-layered modulation QLM, and QLM demodulation algorithms. QLM is used to derive this bound and the QLM performance validates the bound by providing a modulation which becomes close to this bound with error correcting codes such as turbo codes. QLM is a layered topology for transmitting higher data rates than possible with each layer of communications and is implemented by transmitting each layer with a differentiating or equivalently a discriminating parameter which enables separation and decoding of each layer. Performance verification of a representative trellis demodulation algorithm is given for QLM modulation using PSK for each layer. Symbol demodulation algorithms primarily are maximum likelihood ML and trellis algorithms. Trellis algorithms provide the best demodulation performance at the cost of computational complexity. Suboptimal reduced-state iterative trellis demodulation algorithms help to reduce the computational complexity. A second category of demodulation algorithms are trellis bit algorithms which offer substantially lower complexity demodulation at the cost of a demodulation loss. This loss can be reduced with bit correlation error correction decoding which coding is orthogonal to the normal bit sequential error correction decoding of each communication channel.

BRIEF DESCRIPTION OF THE SEVERAL VIEWS OF THE DRAWINGS

The above-mentioned and other features, objects, design algorithms, and performance advantages of the present invention will become more apparent from the detailed description set forth below when taken in conjunction with the drawings and performance data wherein like reference characters and numerals denote like elements, and in which:

FIG. 1 calculates information bits b per symbol interval versus $E_b/N_o$ for the new bound, Shannon bound, and for PSK, QAM at BER=1e-6 with turbo coding.

FIG. 2 calculates information bits b per symbol interval versus S/N=C/I for the new bound, Shannon bound, and for PSK, QAM at BER=1e-6 with turbo coding wherein C/I is the carrier power to interference power ratio in B.

FIG. 3 calculates the performance of QLM PSK and QLM QAM as Bps/Hz=Bits/(symbol Interval)=b vs. $E_b/N_o$.

FIG. 4 calculates the performance of QLM PSK and QLM QAM as Bps/Hz=Bits/(symbol Interval)=b vs. S/N=C/I.

FIG. 5 plots the ideal waveform in time and frequency, the correlation function of the waveform, and a QLM correlation function for $n_p=4$.

FIG. 6 plots a OWDMA Wavelet waveform in time, the Wavelet correlation function in time, and the ideal correlation function in time.

FIG. 7 plots a OFDMA DFT waveform in frequency, the DFT correlation function in frequency, and the ideal correlation function in frequency wherein DFT is the discrete fourier transform.

FIG. 8 illustrates the pulse waveform time offsets for QLM with $n_p$ layers of communications.

FIG. 9A is a block diagram of a trellis symbol demodulation algorithm.

FIG. 9B is the flow diagram of the trellis symbol demodulation algorithm.

FIG. 9C is the continuation of the flow diagram of the trellis symbol demodulation algorithm.

FIG. 10 plots the measured bit error rate BER performance for the uncoded 4-PSK QLM with a $n_p=2$ layered QLM pulse waveform in FIG. 8 using the trellis demodulation algorithm in FIG. 9.

FIG. 11 is a block diagram of a QLM trellis symbol iterative demodulation algorithm.

FIG. 12 plots complexity metric performance of a trellis symbol demodulation algorithm vs. the information bits b.

FIG. 13 plots complexity metric performance of a trellis bit demodulation algorithm vs. the information bits b.

FIG. 14 illustrates decisioning manifolds for 8-PSK for the first two bits of the 3 bit 8-PSK data symbol.

FIG. 15 is a block diagram of a QLM trellis bit demodulation algorithm.

FIG. 16 is a block diagram of a QLM trellis bit iterative demodulation algorithm.

FIG. 17 is a representative transmitter implementation block diagram for OFDMA QLM.

FIG. 18 is a representative transmitter implementation block diagram for CDMA QLM.

FIG. 19 is a representative transmitter implementation block diagram for OWDMA QLM.

FIG. 20 is a representative receiver implementation block diagram for OFDMA QLM.

FIG. 21 is a representative receiver implementation block diagram for CDMA QLM.

FIG. 22 is a representative receiver implementation block diagram for OWDMA QLM.

DETAILED DESCRIPTION OF THE INVENTION

Quadrature parallel-layered modulation QLM is a new invention that increases the data rate supported by a channel by adding layers of independent communications channels or signals over the existing communications such that each layer can be uniquely separated and demodulated in the receiver. These layers of communications channels are parallel sets of communications channels occupying the same bandwidth B as the $1^{st}$ layer which is the original set of communications channels occupying the bandwidth B. Layering of parallel channels or signals is not necessarily an addition of signals in the algebra of the real or complex field since for example for GMSK the layering is in the frequency domain of the FM signal.

The new bound on communications capacity recognizes that one can increase the average symbol rate from the Nyquist rate $1/T_s=B$ assumed in the Shannon bound in equations (1) to the value $n_p/T_s=n_pB=n_p\times$(Nyquist Rate) with $n_p$ layers of the communications or equivalently with the addition of $(n_p-1)$ parallel communications channels with differing characteristics which make them separable and recoverable in the receiver with implementation of a trellis type demodulation algorithm or the equivalent in terms of capabilities and performance where "equivalent" includes the plurality of all possible mathematical techniques to provide alternative solutions compared to the broad class of trellis algorithms. Note that "×" is the multiplication symbol for "times". In this patent disclosure the term "separable" is intended to mean there is a differentiating parameter or equivalently a discriminating parameter which allows the $n_p$ layers or equivalently channels to be uniquely recoverable.

The capacity bound and coding theorem in equations (5) are derived for convenience using time as the differentiating parameter without restrictions on the differentiating parameter. Step 1 in the derivation observes a suitably constructed trellis algorithm will successfully invert the transmitted layers $1, \ldots, n_p$ of communications channels for QLM to recover estimates of the transmitted symbols when the layers are time synchronized for transmission at $T_s/n_p, 2T_s/n_p, \ldots, (n_p-1)T_s/n_p$ offsets respectively for layers $2,3,\ldots,(n_p-1)$ relative to the $1^{st}$ layer at zero offset corresponding to transmitting symbols at $\Delta T_s$ intervals with $\Delta T_s = T_s/n_p$. Maximum capacity for each layer is equal to the Shannon bound in 1 in equations (2) which is the Shannon bound in 2 in equations (1) with b, S/N replaced by $b_p$, $(S/N)_p$ for each layer with the subscript "p" referring to each communications layer. Maximum capacity b in 2 in equations (2) for the $n_p$ layers is the product of $n_p$ and $b_p$ Step 1

1 $\max\{b_p\} = \log_2[1+(S/N)_p]$

2. $b = n_p \log_2[1+(S/N)_p]$     (2)

where $b = n_p b_p =$ Bps/Hz=Bits/(Symbol Interval) is the number of bits over a $T_s$ interval, $(S/N)_p = $ S/N per symbol in each of the parallel-layered communications sets of channels, and the maximum label for b has been removed since there is a dependency on both $n_p$ and $(S/N)_p$ which must be defined in order to transform this equation into a maximum for b.

Step 2 observes the communications layers will equally share in the transmitted S/N and the signal power available for demodulation in each layer is equal to the signal power in each layer over the separation interval $\Delta T_s$. This means for demodulation, each layer receives the signal power over the fraction $\Delta T_s = T_s/n_p$ of the symbol interval $T_s$ and $n_p(S/N)_p = (S/N)_s$ is equal to the signal to noise ratio $(S/N)_s$ over $T_s$ for each layer in 1 in equations (3). The total S/N over $T_s$ is the sum of the $(S/N)_s$ for each layer which yields 2 in equations (3).

Step 2

1 $n_p(S/N)_p = (S/N)_s$

2 $S/N = (n_p{}^2)(S/N)_p$     (3)

Results of steps 1 and 2 are used to derive the $E_b/N_o$ from the value $(E_b/N_o)_p$ in each layer. Substituting the identities $S/N = bE_b/N_o$, $(S/N)_p = b_p(E_b/N_o)_p$, and $b = n_p b_p$ into 2 in equations (3) yields equation (4).

$E_b/N_o = n_p (E_b/N_o)_p$     (4)

Equations (2) and (3) for step 1 and step 2 respectively can be combined with the identity $S/N = bE_b/N_o$ to yield the equations (5) for the new bounds on C, $\max\{b\}$, and $\max\{\eta\}$ as a function of S/N, $E_b/N_o$ and for the minimum $E_b/N_o$ written as $\min\{E_b/N_0\}$ as a function of b wherein the optimization is over the number of communications layers $n_p$.

Upper bounds for b and $\eta$ defined in 2 in equations (5) are derived from 2 in equations (2), 2 in equations (3), and the identities $S/N = bE_b/N_o$ and $\max\{\eta\} = \max\{b\}$ in the form of a maximum with respect to the selection of the parameter $n_p$ for fixed values of S/N in the first expression and in the second for fixed values of $E_b/N_o$ with an interactive evaluation of b from the first expression.

Upper bound for C in 1 in equations (5) is derived from the capacity equation for $\max\{b\}$ in 2 in equations (2) and the identities $b = C/B$ and $S/N = bE_b/N_o$ in the form of an upper bound on C with respect to the selection of the parameter $n_p$ for fixed values of S/N in the first expression and in the second for fixed values of $E_b/N_o$ with an interactive evaluation of b from 2.

Lower bound on $E_b/N_o$ which is the minimum value $\min\{E_b/N_o\}$ in 3 in equations (5) is derived by solving the second expression in 2 and taking the minimum over all allowable values of $n_p$.

The new coding theorem in 4 in equations (5) states that C is the upper bound on the information data rate $R_b$ in bits/second for which error correcting codes exist to provide reliable communications with an arbitrarily low bit error rate BER where C is defined in 1 in equations (5) and upgrades the Shannon coding theorem 3 in equatios (1) using new capacity bound C in 1 in equations (5) and introduces the new data symbol rate 5 whose maximum value $\max\{n_p/T_s\}$ is $n_p$ times the Nyquist rate for a bandwidth B.

New capacity bounds and coding theorem     (5)

1. $C = \max\{n_p B \log_2[1 + (S/N)/n_p{}^\wedge 2]\}$
     $= \max\{n_p B \log_2[1 + (bE_b/N_o)/n_p{}^\wedge 2]\}$ 2. $\max\{b\} = \max\{n_p \log_2[1 + (S/N)/n_p{}^\wedge 2]\}$
     $= \max\{n_p \log_2[1 + (bE_b/N_o)/n_p{}^\wedge 2]\}$
     $= \max\{\eta\}$ 3. $\min\{E_b/N_o\} = \min\{[n_p{}^\wedge 2/b][2^\wedge b]/n_p - 1]\}$ 4. New coding theorem For $R_b < C$ there exists codes which support
         reliable communications
     For $R_b > C$ there are no codes which support
         reliable communications 5. New symbol rate $n_p/T_s$ $\max\{n_p/T_s\} = n_p B$ for $n_p$ layers of communications
     $= n_p x$ (Nyquist rate)

FIG. 1,2 calculate the Shannon bound 63,68, the new bound 62,67, the quadrature amplitude QAM and phase shift keying PSK turbo coded performance, and the QLM performance example from equations (6). The new bound is from equations (4),(5) and the Shannon bound from equations (1) wherein the units for b are Bps/Hz=bits/(symbol interval) consistent with the Shannon bound where "symbol interval" refers to the $T_s$ interval The turbo coded PSK 65,70 and turbo coded QAM 66,71 plot the number of information bits per symbol b versus measured S/N and $E_b/N_o$ for 4-PSK, 8-PSK, 16-QAM, 64-QAM, 256-QAM, 4096-QAM. The 4-PSK, 8-PSK are 4-phase, 8-phase phase shift keying modulations which respectively encode 2,3 bits per symbol and 16-QAM, 64-QAM, 256-QAM, 1024-QAM are 16,64, 256, 4096 state QAM modulations which respectively encode 4,6,8,12 bits. For no coding the information bits per symbol b is equal to the modulation bits per symbol $b_s$ so that $b = b_s = 2,3,4,6,8,12$ bits per symbol respectively for 4-PSK, 8-PSK, 16-QAM, 64-QAM, 256-QAM, 4096-QAM. Turbo coding performance assumes a modest 4 state recursive systematic convolutional code RSC, 1024 bit interleaver, and 4 turbo decoding iterations. The assumed coding rates R=3/4, 2/3, 3/4, 2/3, 3/4, 2/3 reduce the information bits per symbol to the respective values b=1.5,2,3,4,6,8 bits. Performance data is from C. Heegard and S. B. Wicker's book "Turbo Coding", Kluwer Academic Publishers 1999, B. Vucetic and J. Yuan's book "Turbo Codes", Kluwer Academic Publishers 2000, J. G. Proakis's book "Digital Communications", McGraw Hill, Inc. 1995, and L. Hanzo, C. H. Wong, M. S. Lee's book "Adaptive Wireless Transceivers", John Wiley & Sons 2002.

FIG. 1,2 calculate the coded QLM performance 64,69 using equations (6) for QLM PSK (which reads "QLM modulation using PSK data symbol modulation") using the scaling laws for $E_b/N_o=n_p (E_b/N_o)_p$ in equations (4) and for S/N= $(n_p\hat{} 2) (S/N)_p$ in 2 in equations (3). In 1 examples of QLM PSK for 4,8-PSK are given for b=3,4,6,8,12,16 bits per symbol interval as functions of $b_s$=2,3 uncoded bits per data symbol for 4,8-PSK, QLM layers $n_p$=2,4,8, and coding rate R=(information bits/data bits)=2/3,3/4. It is well known that the most bandwidth efficient coding for 4,8-PSK use R=3/4, 2/3 in 1. In 2 the corresponding values of $E_b/N_o$=3.0,4.1 dB for 4,8-PSK at BER=1e−6 are from the turbo coding data in FIG. 1, 2. In 3 the $E_b/N_o$ for $n_p$ layers is calculated from the measured values for the 1$^{st}$ or ground layer in 2 using equations (3). In 4 the S/N is calculated as a function of the $E_b/N_o$ in 3,4 and the b in 1. It should be clear that the combinations of parameters $b_s,n_p,R$ in 1 in equations (6) are a limited subset of possible values. The selected subset is intended to illustrate the principles, algorithms, implementation, and performance, and is not necessarily the preferred subset for overall performance.

QLM PSK performance (6)
1 Information bits b per symbol

| PSK | $b_s \times n_p \times R$ | = | b |
|---|---|---|---|
| 4-PSK | 2×2×3/4 | = | 3 |
| 8-PSK | 3×2×2/3 | = | 4 |
| 4-PSK | 2×4×3/4 | = | 6 |
| 8-PSK | 3×4×2/3 | = | 8 |
| 4-PSK | 2×8×3/4 | = | 12 |
| 8-PSK | 3×8×2/3 | = | 16 |

2 PSK turbo coding measurements
    4-PSK $E_b/N_o$=3.0 dB
        for turbo coding, rate R=3/4, BER=1e−6
    8-PSK $E_b/N_o$=4.1 dB
        for turbo coding, rate R=2/3, BER=1e−6
3 $E_b/N_o$ estimates
    4-PSK $E_b/N_o$=3.0+10 $\log_{10}(n_p)$ dB
    8-PSK $E_b/N_o$=4.1+10 $\log_{10}(n_p)$ dB
4 S/N estimates
    S/N=$E_b/N_o$+10 $\log_{10}(b)$, dB FIG. 3,4 calculate some of the available options for supporting b=Bps/Hz=bits/(symbol interval) performance to 12 Bps/Hz using the scaling laws for $E_b/N_o=n_p (E_b/N_o)_p$ in equations (4), the scaling laws for S/N=$(n_p\hat{} 2)(S/N)_p$ in equations (3), the QLM bound, and the 4-PSK, 8-PSk, 16-QAM, 64-QAM, 256-QAM modulations. FIG. 3 calculates the QLM bound in 24, the QLM 4-PSK b vs. $E_b/N_o$ in 25 for $n_p$=1,2,4,8, the QLM 8-PSK b vs. $E_b/N_o$ in 26 for $n_p$=1,2,4,6 in 26, and the QLM 16-QAM, 64-QAM, 256-QAM b vs. $E_b/N_o$ for $n_p$=1,2,4, $n_p$=1,2,3, $n_p$=1,2, respectively in 27, 28, 29. FIG. 4 calculates the QLM bound in 30 and these modulations for b vs. S/N=C/I for 4-PSK in 31, 8-PSK in 32, 16-QAM in 33, 64-QAM in 34, and 256-QAM I 35. To achieve b=12 Bps/Hz=Bits/(symbol length) the QLM 4-PSK, 8-PSK, 16-QAM, 64-QAM, 256-QAM require successively fewer layers of communications $n_p$=8,6,4,3,2 with attendant successively higher values for the required $E_b/N_o$ and S/N=C/I.

Demodulation algorithms for QLM implement the steps in the signal processing (7):
    QLM Demodulation Signal Processing (7)
        step 1 detects the received QLM signal to remove the waveform and recover the stream of correlated transmitted data symbols at the rate $n_p/T_s=n_pB$ data symbols per second,
        step 2 processes this stream of correlated data symbols to recover estimates of the data symbols for each of the $n_p$ communication channels or sets of channels or layers, and
        step 3 converts the data symbol stream for each channel or each set of channels to a data bit stream and implements error correction decoding of the data bit stream to recover estimates of the transmitted data bits.

In step 2 the ability of the demodulation algorithms to recover the transmitted data symbols from the received QLM communications signal depends on the correlation (auto-correlation) function being well-behaved. A correlation function of a discriminating parameter or equivalently a differentiating parameter such as time offset or frequency offset enables the QLM layers to be demodulated to recover the transmitted data symbols. Plots of representative correlation functions in time and frequency offsets are given in FIG. 5,6,7. The correlations in FIG. 5,6,7 are used to implement step 2 of the demodulation signal processing (7) since their symmetry property makes these correlations equal to convolutions of the waveforms with their stored replicas which is a requirement in step 2 of the demodulation signal processing (7).

FIG. 5 presents an ideal impulse response waveform (pulse waveform) in both time and frequency and the corresponding correlation in time and frequency. In time 12 the ideal impulse response 10 waveform 11 extends over the data symbol $T_s$ second interval 13 and has a correlation function 14 in time 15 with a triangular mainlobe 16 extending over $2T_s$ seconds 18 with zero sidelobes 17. This waveform is the ideal pulse waveform in FIG. 8. In frequency 12 the ideal impulse response 10 waveform 11 extends over the frequency interval B Hz 13 and has a correlation function 14 in frequency 15 with a triangular mainlobe 16 extending over 2B Hz 18 with zero sidelobes 17. The correlation function for the pulse waveform in FIG. 8 for $n_p$=4 is overlayed on the triangular correlation function as a set of circles 19 on the mainlobe and on the sidelobes 17. It is observed there are $2n_p-1=2\times4-1=7$ correlation values in the mainlobe.

FIG. 6 presents a Wavelet waveform in patent application 09/826,118 for OWDMA in time, the correlation function, and an ideal correlation function in time. The correlation function closely approximates the waveform and the ideal triangular correlation closely approximates the mainlobe and has a mainlobe 20 extending over $2T_s$ second interval with low sidelobes 21.

FIG. 7 presents a N=64 point discrete fourier transform DFT for OFDMA in frequency, the correlation function, and an ideal correlation function in frequency. The correlation function closely approximates the waveform and the ideal triangular correlation closely approximates the mainlobe and has a mainlobe extending over $2B=2/T_s$ Hz interval with low sidelobes 23 wherein the symbol rate $1/T_s$ is at the Nyquist rate and equal to the bandwidth B for each channel.

FIG. 8 defines the QLM modulation for an ideal pulse modulation with timing offset as the differentiating parameter between the QLM layers and whose waveform and correlation function are defined in FIG. 5. The reference pulse 33 $p_i = p_i(t)$ defined over time 34 t is 35 $T_s$ seconds long and normalized with amplitude 36 $1/T_s$. Starting time 37 is $t = i_1 T_s$ and ending time 38 is $T_s$ seconds later. Indexing convention is a pulse i has no offset relative to the reference time, pulse i+1 41 has a $\Delta A_s$ offset 37, pulse i−1 43 has a $-\Delta T_s$ offset 37, and this convention applies to all i. Symbol modulation 39 $Ae^{(j\Phi_i)}$ when multiplied by the pulse amplitude 36 $1/\sqrt{T_s}$ is the complex envelope of the pulse waveform. Consecutive pulses are spaced at 40 $\Delta T_s = T_s/n_p$ second intervals. Also shown are the consecutive later pulse 41 and the continuation 42, and the earlier pulses 43 and 44 and the continuation 45. Starting times for these additional pulses are given in 37. This QLM architecture has a pulse overlap of nearest neighbor pulses with a corresponding correlation between these pulses given in FIG. 5 for $n_p = 4$ pulses or layers.

Step 2 demodulation algorithms are grouped into maximum likelihood ML symbol algorithms, trellis symbol algorithms, and trellis bit algorithms. Trellis symbol algorithms are trellis algorithms over the correlated data symbol fields and use ML, maximum a-posteriori MAP, or other decisioning metrics. Trellis bit algorithms are trellis algorithms over the data symbol correlated bit fields. MAP decisioning metrics have been introduced in patent application Ser. No. 10/772,597 for trellis and convolutional decoding using trellis algorithms. This classification of demodulation algorithms is introduced to illustrate representative methods for constructing demodulation algorithms and is not a limitation on the scope of this invention which encompasses all possible demodulation algorithms for QLM.

For step 2 consider a ML symbol detection algorithm using a block algorithm approach with the pulse waveform in FIG. 8. Demodulation for QLM implements signal detection in step 1 to remove the waveform and recover estimates of the transmitted complex baseband signal in step 2 followed by signal decoding in step 3 to recover estimates of the transmitted data. The received pulse waveform is removed by a convolution of the received signal $\hat{z}(t)$ with the complex conjugate of the transmitted pulse waveform and this receiver convolution generates the received Rx estimate $Y_i = X_i + n_i$ of the transmitted Tx symbol wherein the received noise-free waveform after symbol detection is $X_i = \Sigma_{\delta i} Z_{i+\delta i} c(\delta i)$ equal to the correlated sum of the data symbols $Z_{i+\delta i} = A_{i+\delta i} e^{(j\phi_{i+\delta i})}$ with each data symbol encoded with the signal amplitude $A_i$ and signal phase $\phi_i$ for PSK and QAM symbol encoding and where $c(\delta i)$ is the correlation coefficient of the pulse waveform $p_i(t)$ in FIG. 5,8 over neighboring symbols at $i+\delta i = i+/-1, i+/-2, \ldots$ in FIG. 8 and by definition $c(\delta i) = \int p_i(t) p_{i+\delta i}(t) dt$ which is normalized so that $c(0) = 1$, and $n_i$ is the data symbol detection noise. Also, one can partition this integration into integrations over the pulse separations $\Delta T_6$ whereupon the symbol estimates $\hat{Z}_i$ have different values for the correlation coefficients $c(\delta i)$. The signal detection correlation matrix R is constructed from the set of correlation coefficients $\{c(\delta i)\}$ by the equation of definition $R = [R(i,k)] = [c(k-i)]$ and is an n×n matrix for full symbol $T_s$ integration and an $(n+n_p-1) \times (n+n_p-1)$ matrix for partial symbol $\Delta T_s$ integration where n is the number of data symbols and the notation "n×n" reads "n by n". Correlation coefficients for $n_p = 4$ pulses are the values of the correlation function plotted in FIG. 5.

Equations (8) constructs a block length n=5, $n_p = 2$ pulses, pulse length $T_s$ example of the correlation matrix R for FIG. 8 for full symbol integration over the $T_s$ pulse length specified by the parameter set $T_s$, n, $n_p$.

Signal detection correlation matrix (8)

1. Correlation matrix $R$ definition $$R(i, k) = R(\text{row, column})$$
$$= R(\text{output, input})$$
$$= [c(\delta i)] \text{ matrix with elements } c(\delta i)$$
$$= n \times n \text{ matrix for } T_s \text{ integration}$$
$$= (n + n_p - 1) \times (n + n_p - 1) \text{ matrix}$$
$$\text{for } \Delta T_s \text{ integration}$$

2. $R$ for $T_s$, $n = 5$, $n_p = 2$ $$R = \begin{bmatrix} 1 & 0.5 & 0 & 0 & 0 \\ 0.5 & 1 & 0.5 & 0 & 0 \\ 0 & 0.5 & 1 & 0.5 & 0 \\ 0 & 0 & 0.5 & 1 & 0.5 \\ 0 & 0 & 0 & 0.5 & 1 \end{bmatrix}$$

In equations (8) in 1 the data symbols for the array of n transmitted Tx pulses is the n×1 column vector Z with components $\{Z_i\}$ and where $[(o)]'$ is the transpose of $[(o)]$. In 2 components of the n×1 detected signal vector $Y = [Y_1, Y_2, \ldots, Y_n]'$ are equal to $Y_i = X_i + n_i$ introduced in the previous. In 3 the matrix equation for Y is defined where R is the correlation matrix and U is the n×1 Rx noise vector. The definition $E\{UU'\} = 2\sigma^2 R$ enables the ML solution of 3 to be derived $\hat{Z} = [R'(2\sigma^2 R)^{-1} R]^{-1} R(2\sigma^2 R)^{-1} Y$ and simplified to the equivalent equation in 4 where $\hat{Z}$ is the estimate of Z and $\sigma$ is the one-sigma value of the Rx additive white Gaussian noise AWGN for each Rx detected data symbol.

$ML$ symbol detection for $QLM$ (8)

1. $Z = [Z_1, Z_2, \ldots, Z_n]'$
$= [A_1 \exp(j\varphi_1), A_2 \exp(j\varphi_2), \ldots, A_n \exp(j\varphi_n)]$ 2. $Y_i = X_i + n_i$ for all $i$, $X_i = \Sigma_{\delta i} Z_{i+\delta i} c(\delta i)$

3. $Y = RZ + U$

4. $\hat{Z} = R^{-1} Y$

A similar matrix inversion algorithm can be derived for the recovery of estimates $\hat{Z}$ of the transmitted symbol set using the set of signal detection measurements over $\Delta T_s$.

For step 2 consider a trellis symbol algorithm in FIG. 9 using a ML decisioning metric or a MAP decisioning metric disclosed in patent application Ser. No. 10/772,597 or another decisioning metric. FIG. 9A is the top level block diagram of the trellis algorithm for a non-iterative application. Basic elements of the algorithm are the trellis parameters 170, trellis algorithm 171 structured by the parameter set in 170, and the trellis decoding algorithm 172. The trellis algorithm completes or partially completes trellis demodulation before handing off the data symbol estimates and metrics to the trellis decoding algorithm 172 or alternatively, interleaves the trellis error correction decoding 172 with trellis demodulation by accepting one or more data symbol estimates from the trellis algorithm for decoding before returning 173 to the trellis algorithm for processing the next data symbols. Decoding data estimates 174 are handed off to the receiver for further processing. The parameter set 170 is applicable to the ideal pulse modulation defined in FIG. 5,8 with time as the differentiating parameter as well as to the pulse waveforms in FIG. 6,7 and to other applications with other differentiating parameters. The correlation function in FIG. 5 for the pulse waveform in FIG. 8 has zero sidelobes which means only the mainlobe correlation has to be considered in the trellis algorithm. Mainlobe correlation values for $n_p=4$ are plotted in FIG. 5. It is sufficient to use a one-sided correlation function since the correlation is symmetrical about the origin whereupon the correlation vector C whose elements are the mainlobe correlation coefficients is observed to be equal to C=[c(0),c(1),c(2),c(3)]=[1,3/4,1/2,1/4] for $n_p=4$ where the correlation coefficients are c(0),c(1),c(2),c(3). Other trellis parameters are the number of data symbols n, number of parallel QLM channels $n_p$, number of data symbol states $n_s$, and the number of trellis states $n_t=n_3{^\wedge}(2n_p-2)=2{^\wedge}b_s(2n_p-2)$ wherein $n_s=2{^\wedge}b_s=4,8,16,64,356$ for 4-PSK,8-PSK,16-QAM,64-QAM,256-QAM for the correlation function in FIG. 5.

FIG. 9B uses the trellis parameters 170 in the initialization 150 prior to the start k=0 with an empty shift register SR which normally contains the $2n_p-1$ Rx correlated data symbols for the mainlobe plus the correlated symbols for the sidelobes for each of the possible trellis paths. At k=0 the path metric $\alpha_0(xi)$ is set equal to a negative or zero initialization constant for all of the nodes $xi=0,1,2,\ldots,(n_s{^\wedge}(2np-2)-1)$ of the trellis diagram where $\alpha_0(xi)$ is the logarithm of the state $S_0$ path metric at k=0 for node xi, $n_s$ is the number of states of the data symbol modulation, the Rx symbols are indexed over k with k=0 indicating the initial value prior to the Rx symbol k=1, nodes of the trellis diagram are the states of the SR, and state $S_k$ refers to the trellis diagram paths and metrics at symbol k in the trellis algorithm. In the previous for ML block decoding the symbols were indexed over i.

Loop 151 processes the Rx symbols k=1,2,...,n where the index k also refers to the corresponding algorithm steps and to the states of the trellis algorithm. In 152 the Rx signals are pulse detected to remove the carrier frequency and waveform to recover a normalized correlated data symbol $Y_k$. For each Rx symbol $Y_k$ the state transition decisioning metrics $R_k(jxi)$ are calculated by the logarithm transition metric equations $\{R_k(jxi)=-|Y_k-\hat{X}_k(jxi)|{^\wedge}2\}$ for a ML metric, $\{R_k(jxi)=|\hat{x}_k|{^\wedge}2-2\text{Real}(Y_k\hat{X}_k(jxi))*\}$ for a MAP metric wherein (o)* is the complex conjugate of (o), and $\{R_k(jxi)=\text{metric}(Y_k,\hat{X}_k)\}$ for another metric, for all possible transition paths $\{jxi\}$ from the previous state $S_{k-1}(xi)$ at node xi to the new state $S_k(jx)$ at node jx in the trellis diagram snd where $\hat{X}_k(jxi)$ is the hypothesized normalized detected correlated symbol k for the path jxi. For a mainlobe correlation function the $\hat{X}_k(jxi)$ is defined by the equation $\hat{X}_k(jxi)=c(n_p-1)[sr(1)+sr(2n_p-1)]+\ldots+c(1)[sr(n_p-1)+sr(n_p+1)]+c(0)[sr(n_p)]$ which calculates $\hat{X}_k(jxi)$ as the correlated weighted sum of the elements of the shift register SR=[sr(1),sr(2), . . ., sr($2n_p-1$)]' with $\hat{Z}_k=sr(n_p)$, $\hat{Z}_{k-1}=sr(n_p-1)$, $\hat{Z}_{k+1}=sr(n_p+1)$, ... where c(0)=1, the normalized data symbol estimates $\{\hat{Z}_k\}$ correspond to the transition index jxi, and the state k estimated symbol $\hat{Z}_k$ is the SR center element $sr(n_p)$ with correlation coefficient c(0)=1. Symbols move from left to right starting with "j" with each new received symbol or step in the trellis recursion algorithm, and ending with "i". With this convention "j" is indexed over the states of sr(1), "x" is indexed over the current states of sr(2), . . . ,sr($2n_p-2$), and "i" is indexed over the states of sr($2n_p-1$). Index over the paths of the trellis diagram is defined by the equation jxi=sr(1)+$n_s$ sr(2)+$n_s{^\wedge}$ 2sr(3)+ . . . +$n_s{^\wedge}(2n_p-2)$ sr($2n_p-1$)=0,1,2, . . . , $n_s{^\wedge}(2n_p-1)-1$ when the contents of the SR elements are the indices corresponding to the assumed data symbol state values.

Loop 153 calculates the best trellis transition paths from state $S_{k-1}$ to the new state $S_k$ for the new nodes jx=0,1, 2, . . . , $n_s{^\wedge}(2n_p-2)-1$. In 154 the path metric $\alpha_k(S_k)$ is defined by the recursive logarithm equation $\alpha_k(S_k)=\alpha_{k-1}(S_{k-1})+R(S_{k-1}\to S_k)$ which can be rewritten as $\alpha_k(jx)=\alpha_{k-1}(xi)+R(jxi)$ since the state $S_k$ corresponds to node jx, state $S_{k-1}$ corresponds to node xi and the state transition from $S_{k-1}$ to $S_k$ represented symbolically as $S_{k-1}\to S_k$ corresponds to the path jxi.

The best path metric $\alpha_k(jx)$ for each new node jx is chosen by the decisioning equation $\alpha_k(jx)=\text{maximum}\{\alpha_{k-1}(xi)+R_k(jxi)\}$ with respect to the admissible xi. For each jx, the corresponding xi yielding the highest value of the path metric $\alpha_k(jx)$ is used to define the new symbol $\hat{Z}_k$ and path.

For k≧D the state metric $S_k$ is upgraded for this new path jxi by the update operation $S_k(:,jx)=[\hat{Z}_k(jxi);S_{k-1}(1:D-1,xi)]$ using Matlab notation which replaces the column jx vector with the column xi vector after the elements of xi have been moved down by one symbol and the new symbol $\hat{Z}_k$ added to the top of the column vector which is the row 1 element. State $S_k$ is a D by $(n_{101}{^\wedge}(2n_p-2))$ matrix with the column vectors equal to the trellis states over the past D symbols where "D" is the trellis decoding memory extending over several correlation lengths ($2n_p-1$) for the solution to be stabilized. In Matlab notation the $S_k(:,jx)$ is the column vector jx of $S_k$ consisting of the new symbol $\hat{Z}_k$ and the previous D−1 symbols along the trellis path to node jx and the $S_{k-1}(1:D,xi)$ is the D×1 column vector of $S_{k-1}$ for the previous node xi.

For k≦D the state metric $S_k$ is upgraded for this new path jxi by the operation $S_k(::jx)=[\hat{Z}_k(jxi);S_{k-1}(::xi)]$ which replaces the column jx vector with the column xi vector after the new symbol $\hat{Z}_k$ has been added to the top of the column which is the row 1 element to increase the path size by one. State $S_k$ is a k by $(n_{101}{^\wedge}(2n_p-2))$ matrix with the column vectors equal to the trellis states over the past k symbols.

Metric values for each path in $S_k$ are stored for later use in soft decisioning turbo and convolutional decoding. Metrics of interest for each symbol k and for each jx are the values of $\{\alpha_{k-1}(xi)+R(jxi)\}$ for all admissible xi states for the new path symbol $\hat{Z}_k$ for jx for k.

For symbols k≧D the best path jx is found which maximizes $\alpha_k(jx)$ and the estimated value $\hat{Z}_{k-D}$ for symbol k−D is the last row element of the column corresponding to this best path in state metric $S_k$. This continues until k=n and ends the jx loop 153 and the k loop 151.

Processing 162 continues with steps k=n+1, . . . ,n+D−1 160,161 to recover the estimated values $\hat{Z}_{k-D}$ of the Tx symbols $Z_k$ which are read from the corresponding row elements D−1, D−2, . . . , 1 of the column in the state metric $S_n$ corresponding to the best path jx found for the last symbol k=n. This ends the jx loop 161.

Outputs 164 of the trellis algorithm used for trellis decoding are the estimates $\{\hat{Z}_k\}$ of the transmitted symbols $\{Z_k\}$ and the corresponding metric values for all admissible states for each new path symbol $\hat{Z}_k$ for all k. Trellis error correction turbo or convolutional decoding 165 recovers data estimates and hands off the data estimates 166 to the receiver for further processing.

The trellis algorithm for QLM example FIG. 9 using partial symbol $\Delta T_s$ integration presents another approach to a trellis algorithm for symbol recovery which offers a potential reduction in computational complexity compared to the algorithm for full symbol $T_s$ integration in the trellis algorithm in FIG. 9.

The largest computational burden is the calculation of the metrics, paths, and states. For the trellis algorithm in FIG. 9 the number of calculations is essentially determined by the number $n_s{}^\wedge(2n_p-2)$ of nodes in the trellis algorithm. For the $\Delta T_s$ integration in the trellis algorithm the number of nodes reduces to a significantly lower number $n_s{}^\wedge(n_p-1)$. For this invention disclosure it is sufficient to demonstrate the trellis algorithm defined in FIG. 9.

FIG. 10 measures the trellis decoding performance for uncoded 4-PSK $n_p=1$ and for $n_p=2$ layers of QLM modulation implementing the decoding algorithm FIG. 9. Performance is plotted as bit error rate BER versus the normalized value $(E_b/N_o)/n_p$ of the $E_b/N_o$ for the new bound from equation (4). Normalization means that for a given BER the $(E_b/N_o)/n_p$ has the same value for all $n_p$. For example, this means that BER=0.001 requires $(E_b/N_o)/n_p=6.8$ dB and for $n_p=1,2,4$ this requires $E_b/N_o=6.8+0=6.8$, $6.8+3=9.8$, $6.8+6=12.8$ dB respectively. Measured performance values for $n_p=2$ are from a direct error count Monte Carlo simulation of the trellis algorithm and are plotted in FIG. 10 as discrete measurement points.

For step 2 consider an iterative trellis symbol algorithm in FIG. 11. The correlation function observed in FIG. 6, 7 for OWFMA, OFDMA waveforms have sidelobes which cause a degradation in BER performance unless they are incorporated into the trellis algorithm. A method for reducing this loss of BER performance without increasing the number of trellis states is to use an iterative algorithm which calculates the estimated data symbols in the first iteration using part or all of the mainlobe correlation function, uses these estimates to fill in the contributions of the sidelobes in the calculation of the estimated data symbols in the second iteration of the trellis algorithm, and continues this iteration if necessary.

FIG. 11 is a flow diagram of an interative trellis symbol algorithm wherein the iteration is used to incorporate the effects of the sidelobes of the correlation function into the trellis state transition metric function $R_k(jxi)$ in 152 in FIG. 9B in the non-iterative trellis symbol algorithm with a relatively small increase in computational complexity. In FIG. 9 the algorithm is initialized with the parameter set in 176 which is the parameter set in 170 in FIG. 9A with the partitioning of the correlation vector C into the mainlobe vector $C_0$ plus the sidelobe vector $C_1$ and adding the specification of the stopping rule for the iterations. For a correlation vector $C=[c(0),c(1),\ldots,c(n_p-1),c(n_p),\ldots,c(n_c)]$ consisting of $n_c$ correlation coefficients, the mainlobe vector is $C_0=[c(0), c(1),\ldots,c(n_p-1),0,0,\ldots,0]$ and the sidelobe vector is $C_1=[0,0,\ldots,0,c(n_p),\ldots,c(n_c)]$ which partitions C into the vector sum $C=C_0+C_1$.

The iterative algorithm starts 177 by implementing the trellis algorithm 171 in FIG. 9A for the correlation mainlobe using the non-zero $C_0$ coefficients. Output data symbol estimates are used to calculate the a-priori estimated sidelobe contribution $\hat{X}_{k|1}$ in 179 to $\hat{X}_k(jxi)$ which is the hypothesized normalized detected correlated symbol k for the path jxi in the calculation of the metric $R_k(jxi)$ in 152 in FIG. 9B. In this implementation 180 of the trellis algorithm 152,154 in FIG. 9B, the $\hat{X}_k(jxi)=\hat{X}_{k|0}(jxi)+\hat{X}_{k|1}$ is the sum of the hypothesized mainlobe contribution $\hat{X}_{k|0}(jxi)$ using the non-zero $C_0$ coefficients as described in FIG. 9 and the sidelobe contribution $\hat{X}_{k|1}$ using the data symbol estimates from 177 and the non-zero $C_1$ coefficients and wherein the subscripts "k|0" reads "index k given $C_0$" and "k|1" reads "index k given $C_1$". From 152 in FIG. 9B we find the $\hat{X}_{k|0}(jxi)$ is defined by the equation $\hat{X}_{k|0}(jxi)=c(n_p-1)$ $[sr(1)+sr(2n_p-1)]+\ldots+c(1)$ $[sr(n_p-1)+sr(n_p+1)]+c(0)$ $[sr(n_p)]$ which calculates $\hat{X}_{k|0}(jxi)=\hat{X}_k(jxi)$ in FIG. 9B as the correlated weighted sum of the elements of the shift register $SR=[sr(1),sr(2),\ldots,sr(2n_p-1)]'$ with $\hat{Z}_k=sr(n_p)$, $\hat{Z}_{k-1}=sr(n_p-1)$, $\hat{Z}_{k+1}=sr(n_p+1),\ldots$ where $c(0)=1$, the normalized data symbol estimates $\{\hat{Z}_k\}$ correspond to the transition index jxi, and the state k estimated symbol $\hat{Z}_k$ is the SR center element $sr(n_p)$ with correlation coefficient $c(0)=1$. Symbols move from left to right starting with "j" with each new received symbol or step in the trellis recursion algorithm, and ending with "i". With this convention "j" is indexed over the states of $sr(1)$, "x" is indexed over the current states of $sr(2),\ldots,sr(2n_p-2)$, and "i" is indexed over the states of $sr(2n_p-1)$. Index over the paths of the trellis diagram is defined by the equation $jxi=sr(1)+n_s\ sr(2)+n_s{}^\wedge 2sr(3)+\ldots+n_s{}^\wedge(2n_p-2)\,sr(2n_p-1)-1=0,1,2,\ldots,n_s{}^\wedge(2n_p-1)-1$ when the contents of the SR elements are the indices corresponding to the assumed data symbol state values. The sidelobe contribution is equal to $\hat{X}_{k|1}=c(n_p)(\hat{Z}_{k-n_p}+\hat{Z}_{k+n_p})+c(n_p+1)(\hat{Z}_{k-1-n_p}+\hat{Z}_{k+1+n_p})+c(n_p+2)(\hat{Z}_{k-2-n_p}+\hat{Z}_{k+2+n_p})+\ldots$ until the end of the sidelobe correlation coefficients or the end of the data symbol estimates and wherein $\hat{Z}_{k-n_p}$ is the data symbol estimate in 179 for symbol $k-n_p$.

Output of this modified trellis algorithm 180 is the set of data symbol estimates. A stopping rule in 176 is used to decide 182 if another iteration is required. When another iteration is required the data symbol estimates are used 184 to update the calculation 179 of the a-priori contribution $\hat{X}_{k|1}$ of the sidelobes to the $\hat{X}_k(jxi)$ in the modified trellis algorithm 180. With no further iteration the trellis error correction decoding 183 implements the trellis error correction decoding 172 in FIG. 9A, hands off the data estimates 186 to the receiver for further processing. and returns 185 to the trellis algorithm for processing the next data symbol or symbols when the trellis error correction decoding 183 is interleaved with the trellis demodulation. Alternatively, the trellis demodulation is completed or partially completed before handing off the data symbol estimates and metrics to the trellis decoding algorithm 183.

For step 2 a method to reduce the number of trellis states is to use a sequential trellis bit algorithm. With this method the data symbol bits are individually estimated by a trellis algorithm over the correlation function using the corresponding bits of each data symbol for each trellis pass. A comparison of the number of trellis states $n_t$ for the symbol and bit algorithms is given in 1,2 in equations (9). This number $n_t$ of trellis states is required to support each step k of the trellis demodulation and there are $n_p$ demodulation steps in each data symbol interval $T_s$ which means the number of trellis states per $T_s$ second interval is equal to $n_p n_t$. The number of trellis states requires a SR length $2n_p-2$ and is equal to $n_s{}^\wedge(2n_p-2)$ whereas the number of trellis paths requires a SR length $2n_p-1$ and is equal to $n_s{}^\wedge(2n_p-1)$. The computational complexity of a trellis algorithm is driven by the number of trellis states.

Number of trellis states $n_t$ (9)

1. Trellis symbol algorithm trellis states $$n_t = n_s{}^\wedge(2n_p-2)$$
$$= 2^\wedge b_s(2n_p-2)$$

2. Trellis bit algorithm trellis states $$n_t = b_s 2^\wedge(2n_p-2)$$

FIG. 12,13 calculate the number of trellis states $n_t$ for the information bits b per data symbol interval for values to b=12 Bits/Hz=Bits/(Symbol Interval) for the trellis symbol demodulation algorithm and the trellis bit demodulation algorithm respectively using equations (9) to calculate the number of trellis states and calculating the information bits b vs. $n_p$ performance for PSK and QAM from FIG. 3,4. For trellis symbol demodulation, FIG. 12 calculates the number of trellis states $n_t$ vs. b for 4-PSK in 200, 8-PSK in 201, 16-QAM in 202, 64-QAM in 203, and 256-QAM in 204. For trellis bit demodulation, FIG. 13 calculates the number of trellis states $n_t$ vs. b for 4-PSK in 205, 8-PSK in 206, 16_QAM in 207, 64-QAM in 208, and 256-QAM in 209. FIG. 13 compared to FIG. 12 illustrates a reduction in computational complexity using the trellis bit demodulation algorithm compared to the trellis symbol demodulation algorithm.

In FIG. 13 the number of bit passes is equal to the number of modulation bits $b_s$ per data symbol which number multiplies the number of trellis states to calculate the equivalent number of trellis states for the bit algorithm. The data symbol rate reduction required to implement the bit error correction decoding is not factored into these plots since the required code rates are expected to be relatively high and have not been established. With the bit algorithm the complexity of the data symbol modulation may require the simultaneous demodulation of more than one bit for each data symbol in order to reduce the bit(s) decisioning loss and this could increase the complexity of the bit algorithm. Also not factored into these plots is the impact of the differences in the $n_p$ over the $T_s$ interval for the same values of b since the number of data symbol modulations is equal to $n_p n_t$ over a $T_s$ interval for the same values of b.

FIG. 14 illustrates the decisioning manifolds and bit sequencing for QLM 8-PSK demodulation using a trellis bit detection algorithm. In 190 the 8-PSK data symbol modulation is mapped onto a unit circle in the complex plane using the binary representation $b_0 b_1 b_2$ for the $b_s=3$ bit phase states $n_s=8=2^{\wedge}(3\ bit)$ with the zero state 191 equal to $b_0 b_1 b_2=000$. The 8-PSK phase states are arranged as a Gray code with the third bit $b_2=0,1$ values on the respective bit $b_0, b_1$ decisioning boundaries 195,199 of their manifolds in the complex plane to reduce the impact of the undecided bit $b_2$ on the decisioning performance of $b_0$, $b_1$. It is well known that the Gray code reduces the probability of a multibit error and the BER for a given data symbol error since the neighboring symbols differ from each other by only one bit position.

In 192 the decisioning manifolds for the first bit $b_0$ are the respective subspaces of the complex plane 194 with real axis x and complex axis jy wherein $j=\sqrt{(-1)}$, specified by $b_0=0$ decisioning 193 and $b_1=1$ decisioning 193 with the decisioning boundary 195 separating the manifolds. In 196 the decisioning manifolds for the second bit $b_1$ are the respective subspaces of the complex plane 198 specified by $b_1=0$ decisioning 197 and $b_1=1$ decisioning 197 with the decisioning boundary 199 separating the manifolds. In 196 the bit $b_1$ decisioning is conditioned on the knowledge of the first bit $b_0$ being $b_0=0,1$. This means for $b_0=0$ the decisioning manifolds in 196 are restricted to the $b_0=0$ manifold in 192 and for $b_0=1$ to the $b_0=1$ manifold in 192.

FIG. 15 is a flow diagram of a trellis bit demodulation algorithm with correlated bit error correction encoding and decoding. The algorithm is initialized with the parameter set in 210 which is the parameter set 170 in FIG. 9A with the identification of the bit representation $b_0 b_1 b_2 \ldots b_{s-1}$ of the $b_s$ bit trellis states for the data modulation and definition of the corresponding decisioning boundaries and metrics for calculation of the trellis state transition metric $R_k(jxi)$ in 152 in FIG. 9B in the trellis symbol algorithm.

The trellis bit algorithm 211 implements the trellis symbol algorithm in FIG. 9 with the symbols reduced to the first bit $b_0$ for each of the correlated data symbols to initiate the algorithm in the first trellis pass, implements the data symbol words $b_0 b_1$ for the next trellis pass with the bits $b_0$ estimated from the first pass, and so forth until the complete data symbol words $b_0 b_1 b_2 \ldots b_{s-1}$ have been recovered. In each pass the trellis state transition metric $R_k(jxi)$ in 152 in FIG. 9B in the trellis symbol algorithm is calculated using the definition of the corresponding decisioning boundaries and metrics in 210 following the procedure outlined in FIG. 14 for 8-PSK and the estimated bit values from the previous trellis passes.

Bit estimates from the trellis bit algorithm are error correction decoded and re-encoded 213 to correct the decisioning errors resulting from a combination of noise and the non-optimal nature of the bit decisioning metrics. Bit decisioning metrics are non-optimal when there are unknown higher order bits which are undefined since the multi-layer correlations of the parallel QLM channels introduce random fluctuations contributed by these higher order bits. The error correction code finds the correct bit sequence and then regenerates the original encoded bit sequence to enable the next bit pass to be implemented with a relatively clean estimate of the bits in the previous pass. This bit error correction is intended to improve the performance of the trellis bit algorithm. Depending on the tolerance to performance loss this bit error correction can be deleted to avoid the relatively small loss in communications capacity due to the anticipated relatively high rate of the bit encoder.

The sequencing continues 214 when there is another bit to be processed whereupon the corrected bit estimate from the bit error correction 213 is handed off 216 to the trellis bit algorithm 211 for the next pass. When the next-to-last bit has been estimated and corrected by the bit error correction 213 the algorithm stops the sequencing 212 and hands off the estimated data symbols and metrics 217 to the trellis decoding 215 which implements the trellis error correction decoding 172 in FIG. 9A, hands off the bit estimates 219 to the receiver for further processing, and returns 218 to the trellis algorithm for the processing of the next data symbol or symbols. Alternatively, the trellis demodulation is completed or partially completed before handing off the data symbol estimates and metrics to the trellis decoding algorithm 215.

FIG. 16 is a flow diagram of an interative trellis bit algorithm wherein the iteration is used to incorporate the effects of the sidelobes of the correlation function into the trellis state transition metric $R_k(jxi)$ in 152 in FIG. 9B in the non-iterative trellis symbol algorithm with a relatively small increase in computational complexity. In FIG. 16 the algorithm is initialized with the parameter set in 220 which is the parameter set in 210 in FIG. 15 with the partitioning of the correlation vector C into the mainlobe vector $C_0$ plus the sidelobe vector $C_1$ and adding the specification of the stopping rule for the iterations. For a correlation vector $C=[c(0),c(1), \ldots, c(n_p-1),c(n_p), \ldots, c(n_c)]$ consisting of $n_c$ correlation coefficients, the mainlobe vector is $C_0=[c(0),c(1), \ldots, c(n_p-1),0,0, \ldots, 0]$ and the sidelobe vector is $C_1=[0,0, \ldots, 0,c(n_p), \ldots, c(n_c)]$ to partition $C=C_0+C_1$.

The iterative algorithm starts 221 by implementing the trellis algorithm 171 in FIG. 9A with the symbols reduced to the first bits $b_0$ for the correlation mainlobe using the non-zero $C_0$ coefficients. Output bit estimates from the trellis bit algorithm 221 are used to calculate the a-priori estimated sidelobe contribution $\hat{X}_{k|1}$ in 223 to $\hat{X}_k(jxi)$ which is the hypothesized normalized detected correlated symbol k for the path jxi in the calculation of the metric $R_k(jxi)$ in 152 in FIG. 9B. In this implementation 224 of the trellis algorithm 171 in FIG. 9A, the $\hat{X}_k(jxi)=\hat{X}_{k|0}(jxi)+\hat{X}_{k|1}$ is the sum of the hypothesized mainlobe contribution $\hat{X}_{k|0}(jxi)$ using the non-zero $C_0$ coefficients as described in FIG. 9 and the sidelobe constibution $\hat{X}_{k|1}$ using the bit estimates from 221 and the non-zero $C_1$ coefficients and wherein the subscripts "k|0" reads "index k given $C_0$" and "k|1" reads "index k given $C_1$". From 152 in FIG. 9B we find the $\hat{X}_{k|0}(jxi)$ is defined by the equation $\hat{X}_{k|0}(jxi)=c(n_p-1) [sr(1)+sr(2n_p-1)]+ \ldots +c(1) [sr(n_p-1)+sr(n_p+1)]+c(0) [sr(n_p)]$ which calculates $\hat{X}_{k|0}(jxi)=\hat{X}_k(jxi)$ in FIG. 9B as the correlated weighted sum of the elements of the shift register SR=[sr(1),sr(2), ..., sr($2n_p-1$)]' with $\hat{Z}_k=sr(n_p)$, $\hat{Z}_{k-1}=sr(n_p-1),\hat{Z}_{k+1}=sr(n_p+1), \ldots$ where c(0)=1, the normalized data symbol estimates $\{\hat{Z}_k\}$ correspond to the transition index jxi, and the state k estimated symbol $\hat{Z}_k$ is the SR center element sr($n_p$) with correlation coefficient c(0)=1. Symbols (bits) move from left to right starting with "j" with each new received symbol or step in the trellis recursion algorithm, and ending with "i". With this convention "j" is indexed over the states of sr(1), "x" is indexed over the current states of sr(2), ..., sr($2n_p-2$), and "i" is indexed over the states of sr($2n_p-1$). Index over the paths of the trellis diagram is defined by the equation $jxi=sr(1)+n_s\hat{} sr(2)+n_s\hat{} 2sr(3)+\ldots+n_s\hat{}(2n_p-2) sr(2n_p-1)-1=0,1,2,\ldots,n_s\hat{}(2n_p-1)-1$ when the contents of the SR elements are the indices corresponding to the assumed data symbol state values. The sidelobe contribution is equal to $\hat{X}_{k|1}=c(n_p) (\hat{Z}_{k-n_p}+\hat{Z}_{k+n_p})+c(n_p+1) (\hat{Z}_{k-1-n_p}\hat{Z}_{k+1+n_p})+c(n_p+2) (\hat{Z}_{k-2-n_p}+\hat{Z}_{k+2+n_p})+ \ldots$ until the end of the sidelobe correlation coefficients or the end of the data symbol bit estimates and wherein $\hat{Z}_{k-n_p}$ is the data symbol bit estimate in 223 for symbol k–$n_p$.

Output of this modified trellis bit algorithm 224 is the set of data symbol bit estimates which are error correction decoded and re-encoded 226 to correct the decisioning errors. A stopping rule in 227 is used to decide if another iteration is required. When another iteration is required the data symbol bit estimates are used 230 to update the calculation 223 of the a-priori contribution $\hat{X}_{k|1}$ of the sidelobes to the $\hat{X}_k(jxi)$ in the modified trellis algorithm 224. With no further iteration the next bit 228 is processed 225 by the trellis bit algorithm 221 whereupon the corrected bit estimate from the bit error correction 226 is used to generate the sidelobes 223 for the trellis bit algorithm 224 to begin the next set of iterations. When the next-to-last bit has been estimates and corrected by the bit error correction 226 and the iteration algorithm completed 227, the estimated data symbols and metrics are handed off to the trellis error correction decoding 229 which implements the trellis error decoding 172 in FIG. 9A, hands off the data estimates 232 to the receiver for further processing, and returns 231 to the trellis bit algorithm for processing the next data symbol or symbols when the trellis error correction decoding 229 is interleaved with the trellis demodulation. Alternatively, the trellis demodulation is completed or partially completed before handing off the data symbol estimates and metrics to the trellis decoding algorithm 229.

For step 2 there are several ways to reduce the computational complexity at the expense of some performance loss for the trellis symbol and bit algorithms and the iterative trellis symbol and bit algorithms. A method to reduce computational complexity is to reduce the number of trellis states jx and transition paths jxi in 151, 152, 153, 154 in FIG. 9B in the trellis algorithm by eliminating the trellis states and trellis paths in 154 in FIG. 9B which have relatively poor values of the path metric $\alpha_k(jx)$ used to define the new symbol $\hat{Z}_k$ and path. A second method to reduced the computational complexity is to reduce the number of trellis states by eliminating the lower correlation values of the sidelobes and mainlobe. A third method to reduce the computational complexity is to modify the iterative algorithm to calculate the forward trellis performance using the forward half of the mainlobe and followed by a backward trellis algorithm using the other half of the mainlobe wherein the trellis algorithm in FIG. 9 is a forward algorithm and the backward algorithm simply replaces the forward recursive metric equation $\alpha_k(jx)=\alpha_{k-1}(xi)+R(jxi)$ with the backward recursive equation $\beta_{k-1}(jx)=\beta_k(xi)+R(jxi)$ and runs the trellis algorithm in reverse by proceeding with k, k–1, k–2, ... and wherein $\beta_{k-1}(jx)$ is the backward state metric used to define the new symbol $\hat{Z}_{k-1}$ and path as described in application Ser. No. 10/772,597. A fourth method to reduce the computational complexity it so change the forward-backward algorithm to incorporate techniques to eliminate the trellis state and trellis paths with relatively poor performance metrics. These are examples of the various algorithms for reducing the computational complexity at the expense of reducing the demodulation performance. Sequential demodulation techniques, partial symbol and bit integration over $\Delta T_s$ and $\Delta k$ intervals, and other demodulation techniques are available as potential candidates for QLM demodulation. The present invention is not intended to be limited to these QLM demodulation methods and techniques shown herein but is to be accorded the wider scope consistent with the principles and novel features disclosed herein.

OFDMA quadrature parallel-layered modulation QLM can increase the data rate either using timing offsets or using frequency offsets or using a combination of both, as the communications parameter which is changed between layers to allow separability of the layers and recovery of the layered transmitted data in the receiver. OFDMA QLM with frequency offsets is implemented in FIG. 17 in a transmitter and in FIG. 20 in a receiver.

FIG. 17 is a transmitter block diagram modified to support OFDMA QLM with frequency offsets to increase the symbol transmission rate from $1/T_s$ to the QLM rate $n_p/T_s$ and with an increase in transmitter power to support this increased data rate. Ideal OFDMA modulates N input data symbols at the sample rate $1/T_s$ over the time interval $NT_s$ with an N-point inverse fast fourier transform $FFT^{-1}$ to generated N harmonic waveforms $e\hat{}j2\pi kn/N$ with each modulated by the corresponding data symbol wherein the normalized frequencies k=0,1, ... N–1 correspond to channels 0,1, ..., N–1, "j"=$\sqrt{(-1)}$, "n=pi", and "n" is a time index,. Data symbol output rates are $1/NT_s$ per channel and the N channels have a total symbol rate equal to $N/NT_s=1/T_s=B=$(Nyquist sample rate). Signal processing starts with the stream of user input data words $\{d_k\}$ 46 with k indexed over the words. Frame processor 47 accepts these data words and performs turbo error correction encoding, error detection cyclic redundant encoding CRC, frame formatting, and passes the outputs to the symbol encoder 48 which encodes the frame data words into data symbols for handover to the OFDMA QLM signal processing. QLM transmits in parallel N received data symbols for each of the $n_p$ $FFT^{-1}$ signal processing steams. Each set of received N data symbols are offset in frequency by 0, $\Delta k$, $2\Delta k$, ..., ($n_p-1)\Delta k$ with $\Delta k=1/n_p$ using the normalized frequency index k and are implemented in 49 by the frequency translation operator with $FFT^{-1}$ time sample index n. Following this frequency translation and $FFT^{-1}$ signal processing, the output streams of the OFDMA encoded symbols for the $n_p$ frequency offsets are summed 51 and waveform encoded. The output stream of up-sampled complex baseband signal samples 52 $\{z(t_i)\}$ at the digital sample times $t_i$ with digitization index i, is handed over to the digital-to-analog converter DAC, and the DAC output analog signal z(t) is single sideband SSB upconverted 52 to RF and transmitted as the analog signal v(t) wherein v(t) is the real part of the complex baseband signal z(t) at the RF frequency. Non-ideal OFDMA has a separation interval between contiguous $FFT^{-1}$ data blocks to allow for timing offsets and the rise and fall times of the channelization filter prior to the $FFT^{-1}$ processing.

CDMA quadrature parallel-layered modulation QLM can increase the data rate either using timing offsets or using frequency offsets or using a combination of both, as the communications parameter which is changed between layers to allow separability of the layers and recovery of the layered transmitted data in the receiver. CDMA QLM with frequency offsets is implemented in FIG. 18 in a transmitter and in FIG. 21 in a receiver. Using a Hybrid Walsh or a generalized Hybrid Walsh CDMA orthogonal channelization code developed in U.S. Pat. No. 7,277,382 and patent application Ser. No. 09/846,410 localizes the frequency spread of the decoded CDMA signal so that it is feasible to use a trellis algorithm for decoding. With timing offsets the CDMA block codes have to be reshuffled so that the encoded data symbols $Z(n(k)) = \Sigma_u Z(u)C(u,n(k))$ over blocks k=0,1,2, . . . are grouped together for each n to ensure that the timing offsets are not introducing unwanted cross-correlations between CDMA channels.

FIG. 18 is a transmitter block diagram modified to support CDMA QLM with frequency offsets to increase the symbol transmission rate from $1/T_s$ to the QLM rate $n_p/T_s$ and to increase the transmitter power level to support this increased data rate. Signal processing starts with the stream of user input data words $\{d_k\}$ 101 with k indexed over the words. Frame processor 102 accepts these data words and performs the turbo error correction encoding, error detection cyclic redundant encoding CRC, frame formatting, and passes the outputs to the symbol encoder 103 which encodes the frame data words into data symbols for handover to the CDMA QLM signal processing. Similar to OFDMA the frequency translation is performed 104 and the output streams of the CDMA encoded 105 symbols for the $n_p$ frequency offsets are summed 106 and waveform encoded and the up-sampled output stream of complex baseband signal samples 107 $\{z(t_i)\}$ at the digital sample times $t_i$ with digitization index i, is handed over to the DAC and the DAC output analog signal z(t) is SSB upconverted 107 to RF and transmitted as the analog signal v(t) wherein v(t) is the real part of the complex baseband signal z(t) at the RF frequency.

OWDMA quadrature parallel-layered modulation QLM can increase the data rate either using timing offsets or using frequency offsets or using a combination of both, as the communications parameter which is changed between layers to allow separability of the layers and recovery of the layered transmitted data in the receiver. OWDMA QLM with timing offsets is implemented in FIG. 19 in a transmitter and in FIG. 22 in a receiver. OWDMA was developed in patent application Ser. No. 09/826,118. OWDMA generates a uniform bank of orthogonal Wavelet filters with the same spacing and symbol rate as OFDMA and with the advantage that the individual channels remain orthogonal with timing offsets and are less sensitive to frequency offsets.

FIG. 19 is a transmitter block diagram modified to support OWDMA QLM with time offsets to increase the symbol transmission rate from $1/T_s$ to the QLM rate $n_p/T_s$ and to increase the transmitter power level to support this increased data rate. Signal processing starts with the stream of user input data words $\{d_k\}$ 111 with k indexed over the words. Frame processor 112 accepts these data words and performs the turbo error correction encoding, error detection cyclic redundant encoding CRC, frame formatting, and passes the outputs to the symbol encoder 113 which encodes the frame data words into data symbols for handover to the OWDMA QLM transmit signal processing. The $n_p$ time delays 0, $\Delta T_s$, $2\Delta T_s$, $3\Delta T_s$, . . . , $(n_p-1)\Delta T_s$ wherein $\Delta T_s = T_s/n_p$, are performed 114 and the output streams of the OWDMA waveform encoded 115 symbols for the $n_p$ time delays are summed 116 and passband waveform encoded and the up-sampled output stream of complex baseband signal samples 117 $\{z(t_i)\}$ at the digital sample times $t_i$ with digitization index i, is handed over to the DAC and the DAC output analog signal z(t) is single sideband SSB upconverted 117 to RF and transmitted as the analog signal v(t) wherein v(t) is the real part of the complex baseband signal z(t) at the RF frequency.

Other communications applications include TDMA QLM and FDMA QLM. Frequency hopped FH QLM is a layered QLM modulation with multiple access being provided by the FH on the individual hops. PPM QLM can be layered with QLM similar to QAM when the symbol modulation is replaced by pulse-position-modulation PPM. For GMSK QLM the transmitter is modified by the QLM symbol rate increase.

FIG. 20 is a receiver block diagram modified to support OFDMA QLM from the OFDMA QLM transmitter in FIG. 17. Receive signal processing for QLM demodulation starts with the wavefronts 54 incident at the receiver antenna for the $n_u$ users u=1, . . . , $n_u \leq N_c$ which are combined by addition in the antenna to form the receive Rx signal $\hat{v}(t)$ at the antenna output 55 where $\hat{v}(t)$ is an estimate of the transmitted signal v(t) 52 in FIG. 17 that is received with errors in time $\Delta t$, frequency $\Delta f$, and phase $\Delta \theta$. This received signal $\hat{v}(t)$ is amplified and downconverted to baseband by the analog front end 56, synchronized (synch.) in time t and frequency f, waveform removed to detect the received QLM signal at the QLM symbol rate, inphase and quadrature detected (I/Q), and analog-to-digital ADC converted 57. ADC output signal is demultiplexed into $n_p$ parallel signals 58 which are offset in frequency by 0, $-\Delta k$, $-2\Delta k$, . . . , $-(n_p-1)\Delta k$ wherein $\Delta k = 1/n_p$ and processed by the FFT's. Outputs are trellis decoded 59 with an algorithm comparable to the algorithm defined in FIG. 9 for QLM PSK. Outputs are further processed 60,61 to recover estimates $\hat{d}_k$ of the transmitted data $d_k$ with k indexed over the data words.

FIG. 21 is a receiver block diagram modified to support CDMA QLM from the CDMA QLM transmitter in FIG. 18. Receive signal processing for QLM demodulation starts with the wavefronts 121 incident at the receiver antenna for the $n_u$ users u=1, . . . , $n_u \leq N_c$ which are combined by addition in the antenna to form the receive Rx signal $\hat{v}(t)$ at the antenna output 122 where $\hat{v}(t)$ is an estimate of the transmitted signal v(t) 107 in FIG. 18 that is received with errors in time $\Delta t$, frequency $\Delta f$, and phase $\Delta \theta$. This received signal $\hat{v}(t)$ is amplified and downconverted to baseband by the analog front end 123, synchronized (synch.) in time t and frequency f, waveform removed to detect the received QLM signal at the QLM symbol rate, inphase and quadratue detected (I/Q), and analog-to-digital ADC converted 124. ADC output signal is demultiplexed into $n_p$ parallel signals 125 which are offset in frequency by 0, $\Delta k$, $2\Delta k$, . . . , $(n_p-1)\Delta k$ and processed by the CDMA decoders. Outputs are trellis decoded 126 with an algorithm comparable to the algorithm defined in FIG. 9 for QLM PSK. Outputs are further processed 127,128 to recover estimates of the transmitted data $d_k$ wherein k is indexed over the data words.

FIG. 22 is the receiver block diagram modified to support OWDMA QLM from the OWDMA transmitter in FIG. 19. Receive signal processing for QLM demodulation starts with the wavefronts 131 incident at the receiver antenna for the $n_u$ users u=1, $n_u \leq N_c$ which are combined by addition in the antenna to form the receive Rx signal $\hat{v}(t)$ at the antenna output 132 where $\hat{v}(t)$ is an estimate of the transmitted signal v(t) 117 in FIG. 19 that is received with errors in time $\Delta t$, frequency $\Delta f$, and phase $\Delta \theta$. This received signal $\hat{v}(t)$ is amplified and downconverted to baseband by the analog front end 133, synchronized (synch.) in time t and frequency f, waveform removed to detect the received QLM signal at the QLM symbol rate, inphase and quadrature detected (I/Q) and analog-to-digital ADC converted 134. ADC output signal is demultiplexed into $n_p$ parallel signals 135 which are offset in time by 0, $\Delta T_s$, $2\Delta T_s$, ..., $(n_p-1)\Delta T_s$ and processed by the OWDMA decoders. Outputs are trellis decoded 136 with an algorithm comparable to the algorithm defined in FIG. 9 for QLM PSK. Outputs are further processed 137,138 to recover estimates $\hat{d}_k$ of the transmitted data $d_k$ wherein k is indexed over the data words.

Consider the QLM modulation and demodulation algorithms and implementation for GMSK. QLM increases the data rate by transmitting $n_p>1$ layers of data encoded Gaussian frequency pulses that are time synchronized for transmission at $T_s/n_p$, $2T_s/n_p$, ..., $(n_p-1)T_s/n_p$ offsets respectively for layers 2,3, ..., $(n_p-1)$ relative to the ground or $1^{st}$ layer of GMSK. This means the bit-rate increases from $1/T_s$ to $n_p/T_s$ and the bit or symbol time remains the same at $T_s$. The trellis algorithm in FIG. 9 is combined with the Viterbi algorithm, with suitable modifications to model the architecture of the GMSK demodulator.

This patent covers the plurality of everything related to QLM generation, QLM demodulation, and data recovery of QLM and to the corresponding bounds on QLM to all applications of QLM inclusive of theory, teaching, examples, practice, and of implementations for related technologies. The representative transition metric and trellis algorithms for QLM demodulation are examples to illustrate the methodology and validate the performance and are representative of all QLM demodulation algorithms including maximum likelihood ML, maximum a posteriori MAP, maximum a priori, finite field techniques, direct and iterative estimation techniques, trellis symbol and iterativw trellis symbol and with/without simplifications, trellis bit and iterative trellis bit and with/without simplifications and with/without bit error correction coding, and all other related algorithms whose principal function is to recover estimates of the transmitted symbols for QLM parallel layered modulation as well as data recovery related to QLM and the QLM bounds.

Preferred embodiments in the previous description of modulation and demodulation algorithms and implementations for QLM for the known modulations and demodulations and for all future modulations and demodulations, are provided to enable any person skilled in the art to make or use the present invention. The various modifications to these embodiments will be readily apparent to those skilled in the art and the generic principles defined herein may be applied to other embodiments without the use of the inventive faculty. Thus, the present invention is not intended to be limited to the embodiments shown herein but is to be accorded the wider scope consistent with the principles and novel features disclosed herein. Additional applications for QLM signal processing and bound include the plurality of information theorectic applications with examples being radar, imaging, and media processing.

What is claimed is:

1. A method for implementation of Quadrature Parallel-Layered Modulation (QLM) in a communications transmitter for communications over the same frequency bandwidth of a carrier frequency using time offset as a differentiating parameter, said method comprising the steps:

generating a communications signal over a frequency bandwidth at the data symbol rate $n_p/T_s$ wherein
1) each data symbol is encoded with information and has the same waveform
2) the Nyquist rate for the data symbol transmission is equal to $1/T_s$,
3) the Nyquist rate is equal to the bandwidth $1/T_s$ of the data symbol waveform and is the data symbol transmission rate $1/T_s$ which is sufficient to transmit all of the information in each data symbol,
4) $n_p$ is the increase in the Nyquist data rate supported by QLM,
5) this increase in Nyquist data rate can be viewed as increasing to $n_p$ the number of parallel communications channels supported by QLM at the data symbol rate $1/T_s$,
6) timing offset $\Delta T_s$ equal to the data symbol spacing $\Delta T_s = T_s/n_p$ is the differentiating parameter when viewing this increase in data symbol rate as parallel communications channels which are independent since the QLM demodulation algorithm recovers the data symbols and data symbol encoded information at the QLM data symbol rate $n_p/T_s$,
7) each of these parallel channels of communications has a unique timing offset which can be identified as the channel 1 data symbols with no timing offset, channel 2 data symbols with $\Delta T_s$ offset, channel 3 data symbols with $2\Delta T_s$ offset, and continuing to channel $n_p$ data symbols with $(n_p-1)\Delta T_s$ offset,
8) which means one can transmit $n_p$ parallel layers of communications channels over the same frequency bandwidth and recover the information in a receiver with a QLM demodulation algorithm, up-converting the QLM signal to a radio frequency RF, power amplifying, transmitting the RF QLM signal using the communications transmitter, and receiving the transmitted RF QLM signal in a communications receiver, amplifying, down-converting, and QLM demodulating the received QLM signal following by decoding to recover the data symbol information.

2. A method for implementation of orthogonal frequency division multiple access (OFDMA) QLM for communications using frequency offset as a differentiating parameter, said method comprising the steps:

generating a first communications signal over a frequency bandwidth $1/T_s$ at a carrier frequency for a first set of N channels by modulating a first stream of N data symbols at a data symbol rate $1/T_s$ with an N-point inverse fast fourier transform ($FFT^{-1}$) waveform over a $FFT^{-1}$ block length $NT_s$ to generate N orthogonal frequency harmonics modulated with the respective data symbols and which modulated harmonics are the N channels for communications, generating a second communications signal over the same block length over the same frequency bandwidth at the same carrier frequency for a second set of N channels by modulating a second stream of N data symbols at a data symbol rate $1/T_s$ with the same $FFT^{-1}$ waveform with a frequency offset $\Delta k$ equal to $\Delta k=1/n_p$ wherein "$n_p$" is the number of QLM sets of channels in said frequency bandwidth and $FFT^{-1}$ harmonics are $e^{\hat{}}j2\pi(k+\Delta k)n/N$ for normalized frequencies k=0,1, ... N-1 corresponding to channels 0,1, ..., N-1 wherein "j"=$\sqrt{(-1)}$, "n=pi", and "n" is a time index, for any additional sets of channels, continuing generation of communication signals over the same block length over the same frequency bandwidth at the same carrier frequency by modulating additional streams of data symbols with the same waveform at the same data symbol rate as the first and second streams of data symbols with frequency offsets increasing in each communication signal in increments of $\Delta k=1/n_p$ until the $n_p$ signals are generated for $n_p$ QLM sets of channels, repeating this generation of the QLM signal for the next $FFT^{-1}$ block length $NT_s$ and continuing for subsequent block lengths, transmitting and receiving said communications signals over a QLM communications link consisting of the $n_p$ QLM sets of channels, recovering data symbols of the communications signals in a receiver using a demodulation algorithm, and combining said algorithm with error correction decoding to recover the transmitted information whereby frequency offset has been used as a differentiating parameter to enable QLM parallel sets of channels for communications over the same frequency bandwidth at the same carrier frequency with a data symbol rate independent of the Nyquist rate, to be demodulated.

3. The method in claim 2 for implementation of orthogonal frequency division multiple access (OFDMA) QLM in a communications transmitter and a communications receiver for communications using frequency offset as a differentiating parameter, said method further comprising:

constructing QLM parallel channels or parallel groups of channels of communications for a QLM communications link over a frequency bandwidth of a carrier frequency with a data symbol rate independent of the Nyquist rate, using one or more data symbol modulations for the QLM communications channels, using one or more differentiating parameters to enable the channel signals of the QLM link to be demodulated, implementing said demodulation using a trellis algorithm or maximum likelihood algorithm or another demodulation algorithm combined with error correction decoding algorithms, wherein said QLM demodulated signal in a communications receiver has been generated in a communications transmitter, up-converted to a radio frequency RF, power amplified, and transmitted as a RF QLM signal in a communications transmitter, and received in said communications receiver, amplified, down-converted, and QLM demodulated followed by decoding to recover the data symbol information.

4. A method for implementation of QLM demodulation for communications over the same frequency bandwidth of a carrier frequency using time and/or frequency and/or other offsets as the differentiating parameters and using trellis symbol demodulation, said method comprising the steps:

receiving QLM data symbols indexed on $k=1,2,\ldots,n$ for n data symbols, evaluating correlation coefficients for received QLM data symbols, establishing trellis states and trellis paths for each data symbol whereby a) there are $n_s\hat{}(2n_c-2)$ trellis states wherein "$n_s$" is the number of states of each data symbol, and "$n_c$" is the number of one-sided correlation coefficients for symmetrical correlation functions, b) there are $n_s\hat{}(2n_c-1)$ trellis paths from trellis state $S_{k-1}$ for data symbol $k-1$ to a new trellis state $S_k$ for data symbol k, c) index $jxi=0,1,2,\ldots,n_s\hat{}(2n_c-1)-1$ is a trellis path index from $S_{k-1}$ to $S_k$ using $n_s$-ary index symbols jxi reading from left to right wherein "j" is an index for a new data symbol, "i" is an index for a last data symbol and "x" is a set of $n_s$-ary index data symbols between "j" and "i", d) index jx is over $n_s\hat{}(2n_c-2)$ trellis states $S_k(jx)$, e) index xi is over $n_s\hat{}(2n_c-2)$ trellis states $S_{k-1}(xi)$, f) creating a D row by $n_s\hat{}(2n_c-2)$ column memory "M" for storing trellis path decisions wherein D is a multiple of $n_c$, initializing the trellis algorithm for $k=0$ implementing the trellis algorithm for each step k starting with $k=1$ by 1) evaluating hypothesized values $\hat{X}_k(jxi)$ of received QLM correlated data symbols for all paths jxi, 2) measuring a received QLM data symbol $Y_k$ for data symbol k, 3) evaluating a logarithm state transition decisioning metric $R(jxi)$ which is a function of $\hat{X}_k(jxi)$ and $Y_k$ for symbol k for all possible paths jxi from $S_{k-1}(xi)$ to $S_k(jx)$, 4) finding a best path metric $\alpha_k(jx)$ and corresponding path jxi from $S_{k-1}(xi)$ to $S_k(jx)$ by using a logarithm decisioning equation $\alpha_k(jx)=\max\{\alpha_{k-1}(xi)+R_k(jxi)\}$ which finds xi that maximizes "max" the sum "$\alpha_{k-1}(xi)+R_k(jxi)$" for a given jx, 5) using said $\alpha_k(jx)$ and corresponding jxi to define a data symbol estimate $\hat{Z}_k$ for $S_k(jx)$, 6) for $k<D$ continuing to fill memory M from the top down by replacing column xi with column jx after moving the row elements of column xi down by one symbol and placing $\hat{Z}_k$ in the vacant first row, for all jx, 7) for $k\geq D$ continuing to replenish memory M from the top down by replacing column xi with column jx after moving the row elements of column xi down by one symbol and placing $\hat{Z}_k$ in the vacant first row, for all jx, 8) for $k\geq D$ selecting the last symbol $\hat{Z}_{k-D}$ in column jx in the deleted bottom row corresponding to the maximium value of $\alpha_k(jx)$ over all jx, as the best estimate of data symbol $k-D$, 9) for $k>n$ continuing step 8 without replenishing memory M to complete the estimates of the n data symbols, 10) performing error correction decoding of these estimated data symbols, wherein said QLM demodulated signal in a communications receiver has been generated in a communications transmitter, up-converted to a radio frequency RF, power amplified, and transmitted as a RF QLM signal in a communications transmitter, and received in said communications receiver, amplified, down-converted, and QLM demodulated as described in this claim followed by decoding to recover the data symbol information.

5. The method in claim 4 for implementation of QLM demodulation in a communications receiver for communications over the same frequency bandwidth of a carrier frequency using time and/or frequency and/or other offsets as the differentiating parameters and using trellis symbol iterative demodulation, said method further comprising the steps:

modifying said trellis symbol algorithm to iteratively include the correlation sidelobes by 1) implementing said trellis algorithm over the mainlobe correlation coefficients for the received correlated data symbols, 2) using data symbol estimates from step 1 to evaluate a contribution $\hat{X}_{k|1}$ of the sidelobes enabling the hypothesized values $\hat{X}_k(jxi)$ of received QLM correlated data symbols for all paths jxi to be evaluated as the sum $\hat{X}_k(jxi)=\hat{X}_{k|0}(jxi)+\hat{X}_{k|1}$ wherein $\hat{X}_{k|0}(jxi)$ is the hypothesized mainlobe contribution for all jxi, 3) repeating step 1 using a expression for $\hat{X}_k(jxi)$, 4) continuing said iteration as required for convergence to a stable solution, 5) completing the trellis algorithm with the error correction decoding in said step 10, wherein said QLM demodulated signal in a communications receiver has been generated in a communications transmitter, up-converted to a radio frequency RF, power amplified, and transmitted as a RF QLM signal in a communications transmitter, and received in said communications receiver, amplified, down-converted, and QLM demodulated as described in this claim followed by decoding to recover the data symbol information.

6. The method in claim 4 for implementation of QLM demodulation in a communications receiver for communications over the same frequency bandwidth of a carrier frequency using time and/or frequency and/or other offsets as the differentiating parameters and using trellis bit demodulation, said method further comprising the steps:

using said trellis symbol algorithm to implement a trellis bit algorithm by 1) implementing said trellis symbol algorithm with data symbols reduced to a first bit $b_0$ for each of the received correlated data symbols in a first pass, 2) implementing error correction decoding and re-encoding of the estimated first bits from step 1 to correct the decisioning errors if necessary, in the first pass, 3) repeating step 1 using two-bit data symbol words $b_0 b_1$ in a second pass wherein bit $b_0$ is the estimate from the first pass and the second bit $b_1$ is estimated by the trellis algorithm, 4) for additional bits in the data symbol words, repeat error correction decoding and re-encoding in step 2 for the second pass and implement step 3 in a third pass to estimate $b_0 b_1 b_2$ using the previous estimates of $b_0 b_1$ from the second pass, 5) repeating step 3 for each additional bit in the data symbol words, 6) continuing with these passes until the final bit pass to estimate the data symbols, performing error correction decoding of these estimated data symbols, wherein said QLM demodulated signal in a communications receiver has been generated in a communications transmitter, up-converted to a radio frequency RF, power amplified, and transmitted as a RF QLM signal in a communications transmitter, and received in said communications receiver, amplified, down-converted, and QLM demodulated as described in this claim followed by decoding to recover the data symbol information.

7. The method in claim 4 for implementation of QLM demodulation in a communications receiver for communications over the same frequency bandwidth of a carrier frequency using time and/or frequency and/or other offsets as the differentiating parameters and using trellis bit iterative demodulation, said method further comprising the steps:

using said trellis symbol algorithm to implement said iterative trellis bit algorithm by 1) implementing a trellis symbol algorithm with the symbols reduced to the first bit $b_0$ for each of the correlated data symbols in a first pass, 2) using bit estimates from step 1 to evaluate a contribution $\hat{X}_{k|1}$ of the sidelobes enabling hypothesized values $\hat{X}_k(jxi)$ of received QLM correlated data bits for all paths jxi to be evaluated as a sum $\hat{X}_k(jxi)=\hat{X}_{k|0}(jxi)+\hat{X}_{k|1}$ wherein $\hat{X}_{k|0}(jxi)$ is a hypothesized mainlobe contribution for all jxi, 3) repeating step 1 using this expression for $\hat{X}_k(jxi)$, 4) continuing this iteration as required for convergence to a stable solution, 5) implementing error correction decoding and re-encoding of the first bits to correct the decisioning error if necessary, 6) repeating steps 1-4 using two-bit data symbol words $b_0 b_1$ in a second pass wherein bit $b_0$ is estimated from the first pass and the second bit $b_1$ is estimated by the iterative trellis algorithm, 7) for additional bits in the data symbol words, repeat error correction decoding and re-encoding in step 5 for the second pass and implement step 6 in a third pass to estimate $b_0 b_1 b_2$ using the previous estimates of $b_0 b_1$ from the second pass, 8) repeating step 6 for each additional bit in the data symbols, 9) continuing with these passes until the final bit pass to estimate the data symbols, and 10) performing error correction decoding of these estimated data symbols, wherein said QLM demodulated signal in a communications receiver has been generated in a communications transmitter, up-converted to a radio frequency RF, power amplified, and transmitted as a RF QLM signal in a communications transmitter, and received in said communications receiver, amplified, down-converted, and QLM demodulated as described in this claim followed by decoding to recover the data symbol information.

8. The method in claim 4 or claim 5 or claim 6 or claim 7 for implementation of QLM in a communications transmitter and a communications receiver for communications over the same frequency bandwidth of a carrier frequency using time and/or frequency and/or other offsets as the differentiating parameters and using a demodulation method implemented with methods for reducing computational complexity, said methods for reducing computational complexity further comprising:

reducing the number of trellis states jx and transition paths jxi in the trellis algorithm by eliminating trellis states and trellis paths which have relatively poor values of the path metric $\alpha_k(jx)$ used to select a new data symbol estimate, reducing the number of trellis states by deleting lower correlation values of the sidelobes and mainlobe, modifying an iterative trellis algorithm to calculate the forward trellis performance using the forward half of the mainlobe and followed by a backward trellis algorithm using the other half of the mainlobe, modifying said iterative trellis algorithm to incorporate said techniques to eliminate trellis state and trellis paths with relatively poor performance metrics, using sequential demodulation techniques, partial symbol and bit integration over $\Delta T_s$ intervals and $\Delta k$ intervals, and other demodulation techniques as potential candidates for QLM demodulation, wherein said QLM demodulated signal in a communications receiver has been generated in a communications transmitter as disclosed in claims 1 and 2, up-converted to a radio frequency RF, power amplified, and transmitted as a RF QLM signal in a communications transmitter, and received in said communications receiver, amplified, down-converted, and QLM demodulated as described in this claim followed by decoding to recover the data symbol information.

\* \* \* \* \*